MAGNETIC LEDGER CARD MACHINE
Filed Dec. 28, 1962 19 Sheets-Sheet 1
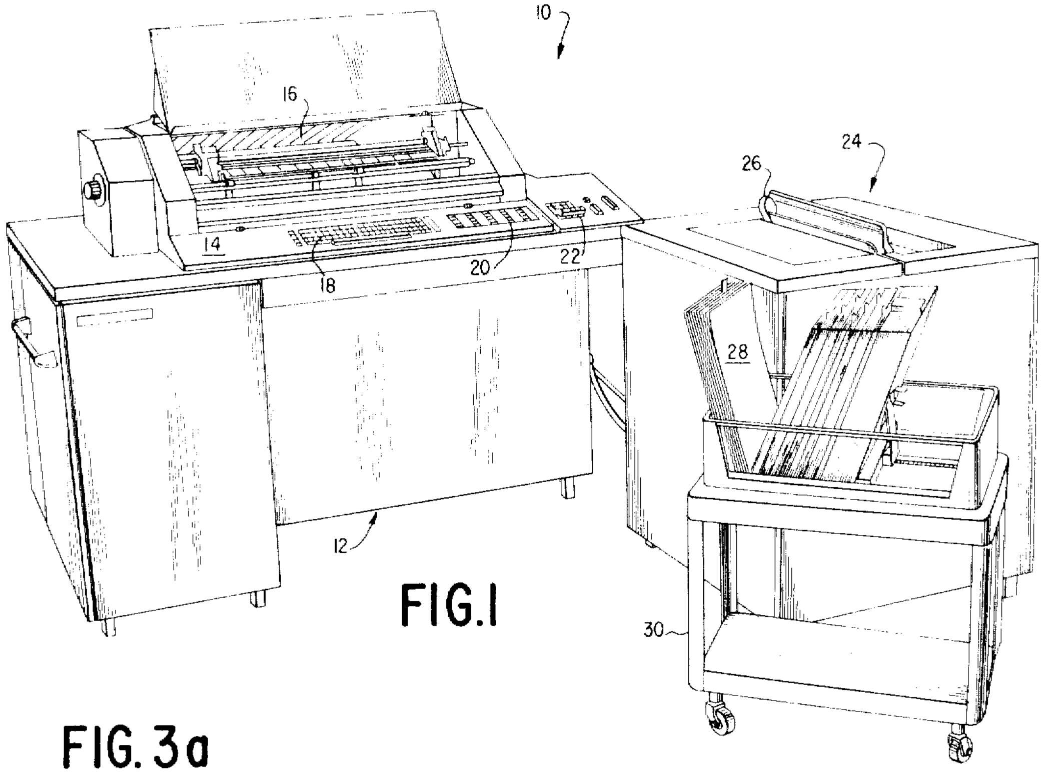
FIG. 1
FIG. 3a
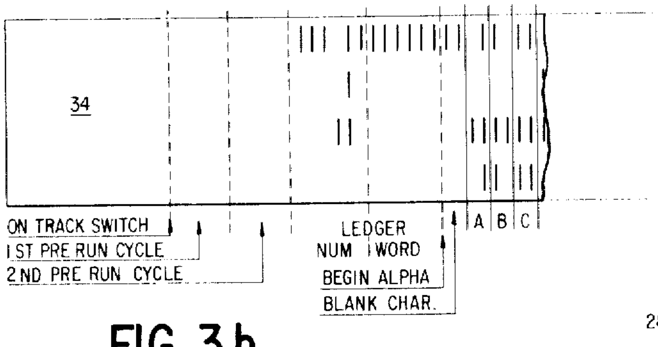
FIG. 2
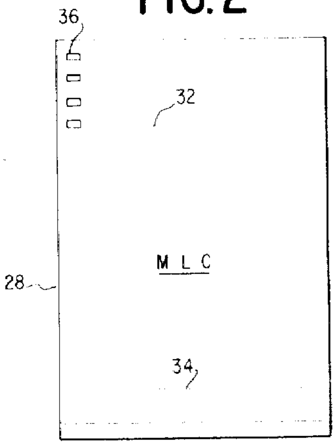
FIG. 3b
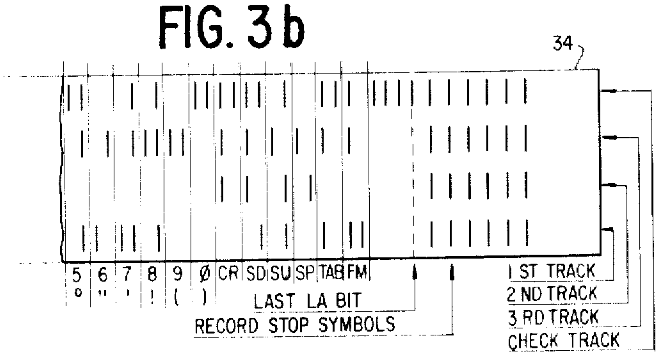
INVENTORS
CHARLES S. JENKINS
NORWOOD K. PERKINS
BY
Sughrue, Rothwell, Mion and Zinn
ATTORNEYS Dec. 27, 1966 C. S. JENKINS ETAL 3,294,956

MAGNETIC LEDGER CARD MACHINE

Filed Dec. 28, 1962 19 Sheets-Sheet 5

MAGNETIC LEDGER CARD MACHINE

Filed Dec. 28, 1962 19 Sheets-Sheet 7

Dec. 27, 1966 C. S. JENKINS ETAL 3,294,956

MAGNETIC LEDGER CARD MACHINE

Filed Dec. 28, 1962 19 Sheets-Sheet 8

Dec. 27, 1966 C. S. JENKINS ETAL 3,294,956

MAGNETIC LEDGER CARD MACHINE

Filed Dec. 28, 1962 19 Sheets-Sheet 16

Dec. 27, 1966 C. S. JENKINS ETAL 3,294,956

MAGNETIC LEDGER CARD MACHINE

Filed Dec. 28, 1962 19 Sheets-Sheet 18

United States Patent Office 3,294,956
Patented Dec. 27, 1966

3,294,956
MAGNETIC LEDGER CARD MACHINE

Charles S. Jenkins and Norwood K. Perkins, Lexington, Ky., assignors to International Business Machines Corporation, New York, N.Y., a corporation of New York Filed Dec. 28, 1962, Ser. No. 248,117
17 Claims. (Cl. 235—61.9)

This invention relates to improvements in machines for handling and processing both machine and human readable unit records. More particularly, this invention relates to a magnetic ledger card machine usable as a part of an accounting system for operating on machine and human readable unit records to magnetically read and record on the records as well as print out on the records and to automatically handle the records for these operations in a predetermined sequence.

The machine of this invention is operator oriented and is usable with an accounting machine system to automatically enter into or to read out from the system both alpha and numeric data to and from other components of the accounting system and to and from a magnetic ledger card in the machine with a minimum of operator activity. By reading out from a machine readable record, operator error for data entry is reduced and the time of data input is significantly increased.

The general objects of this invention are to provide an operator oriented machine to rapidly and automatically handle unit records which are both machine and human readable, and to relieve an operator from entering fixed data into the accounting system and from positioning a ledger card at a posting line.

Accordingly it is another object of this invention to provide a mechanism for positioning and referencing a magnetic ledger card so that information may be read from or written on to a magnetic stripe thereon by a movable magnetic head which traverses the ledger card.

By having a movable magnetic transducer and a stationary unit document, the document is always aligned first and the transducer always starts from the same point. The arrangement is not as subject to misalignment as the reverse arrangement of a movable document and stationary transducer and does not depend on past history of recording and writing operations for alignment and read out.

The magnetic ledger card machine of this invention is adapted to automatically handle and perform magnetic recording transducing operations as well as print out on a magnetic ledger card. The magnetic ledger card has upon its face an area for receiving printed information such as headings and billing data and has extending across the back of the card adjacent the lower edge a stripe of magnetizable material on which both alpha and numeric information may be magnetically recorded.

The machine of this invention operates automatically to handle the card, upon its insertion into a card receiving throat, to advance the card to an aligned position in which the magnetic stripe is related positively to the machine and information on the stripe is read out by a movable magnetic head. This information may be read into the other components of the accounting system. After reading, the magnetic leadger card is advanced to a predetermined position in which a print element can print out a line of information across the face of the card. After printing the card is fed in a reverse direction back to the magnetic transducing station and is again aligned for a recording operation performed by a movable magnetic head scanning across the stationary and aligned card. After recording the magnetic head makes another scanning pass to check the information recorded and, if an error is found, operate an error cycle. After the complete operation the card is ejected for removal by an operator.

It is desirable that a magnetic transducer reading out a stationary document always start its recording and read out operations from low order to high order and always from the same side. This eliminates reversal of the memory. It is a further object of this invention to provide magnetic read/write operations on a stationary unit document by a movable magnetic head in which the head always travels in the same direction during its transducing scans.

In magnetic transducing operations, it is advantageous to prevent wear of the magnetic transducer. It is an object of the invention to prevent wear on magnetic transducer by holding the transducer out of contact with the record during nonrecording operations and during insertion and removal of the record.

It is another object of this invention to automatically position a unit record relative to a print station to determine the particular line that the printer should print out on the ledger card so that the line being printed is always a predetermined distance underneath the last printed line. That is, it is an object to position a ledger card relative to a printing station so that the ledger card is always positioned for printing one line below the last printed line on the ledger card.

It is an additional object of this invention to provide a machine that operates automatically as soon as a magnetic ledger card is inserted into the machine to go through all of the operations in timed sequence including the card, feeding the card to a predetermined print position, feeding the card out to the magnetic transducer position, recording again on the magnetic stripe of the card, checking the recording and finally feeding the card back out of the machine.

Other objects of the invention will be pointed out in the following description and claims and illustrated in the accompanying drawings, which disclose by way of example, the principle of the invention and the best mode which has been contemplated of applying that principle.

In the drawings:

FIGURE 1 is a perspective view of the outside of an entire accounting machine system including the magnetic ledger card machine of this invention;

FIGURE 2 is a view of a magnetic ledger card used in the magnetic ledger card machine of this invention;

Figure 4:
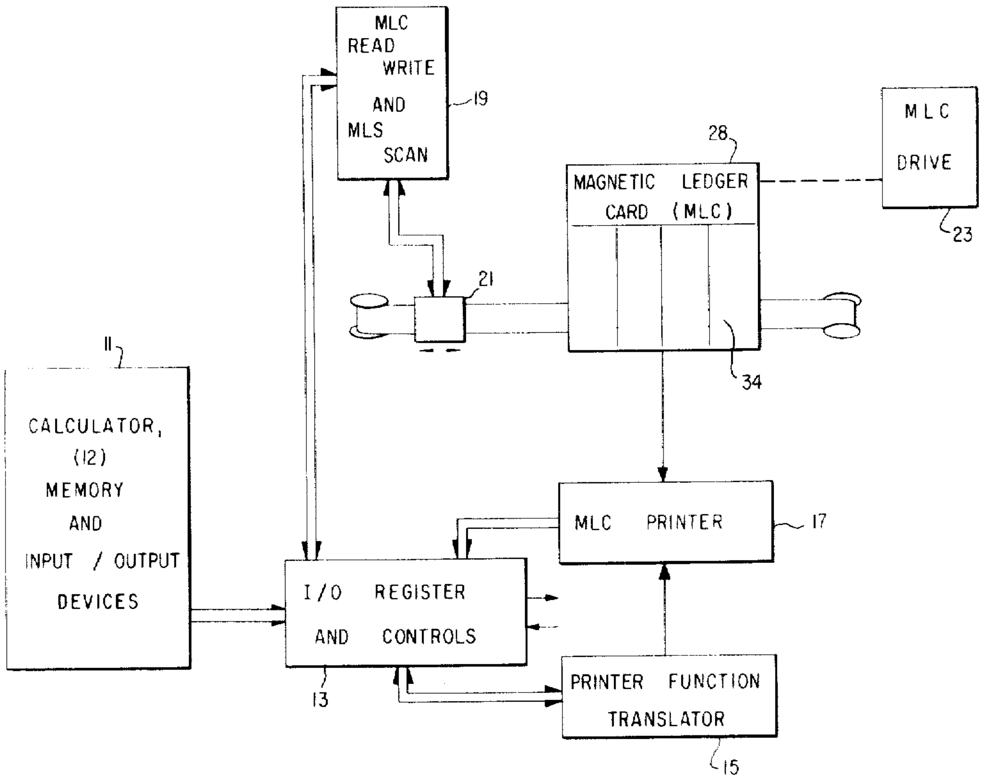
Figure 5:
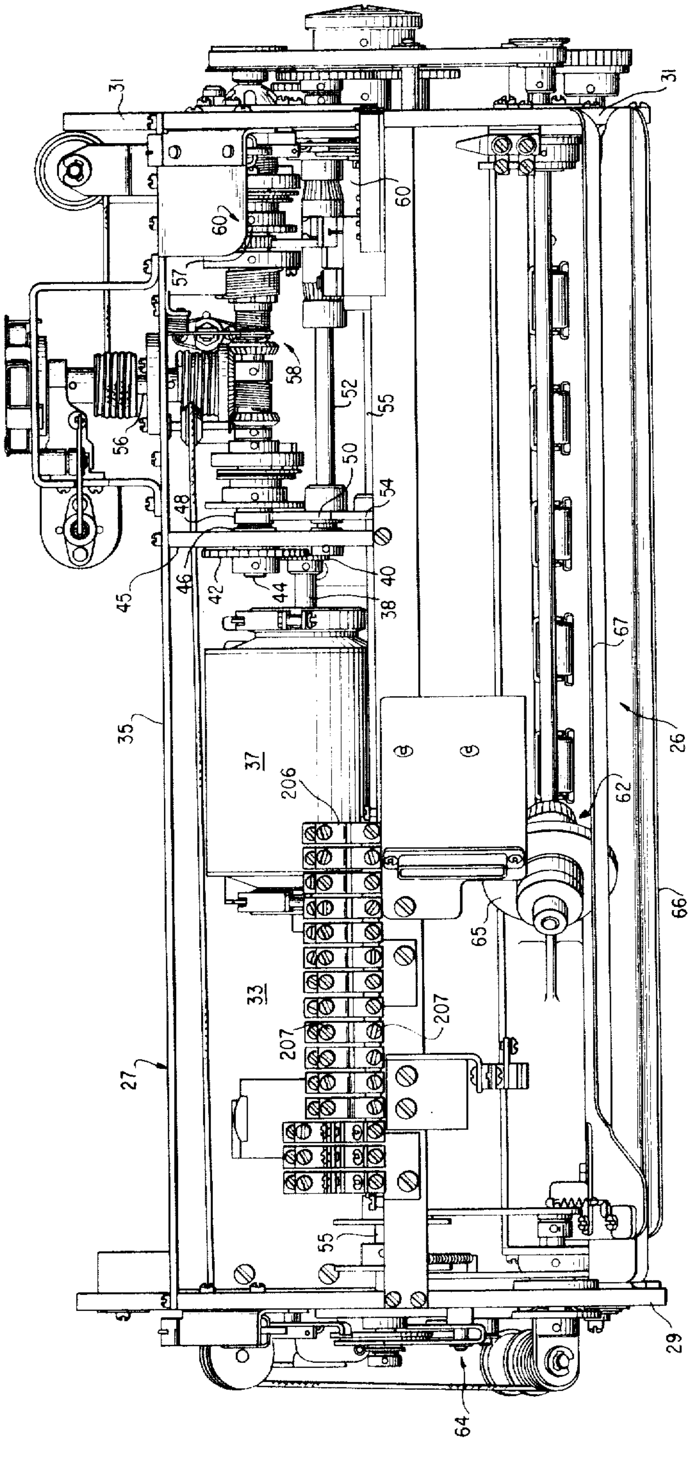
Figure 6:
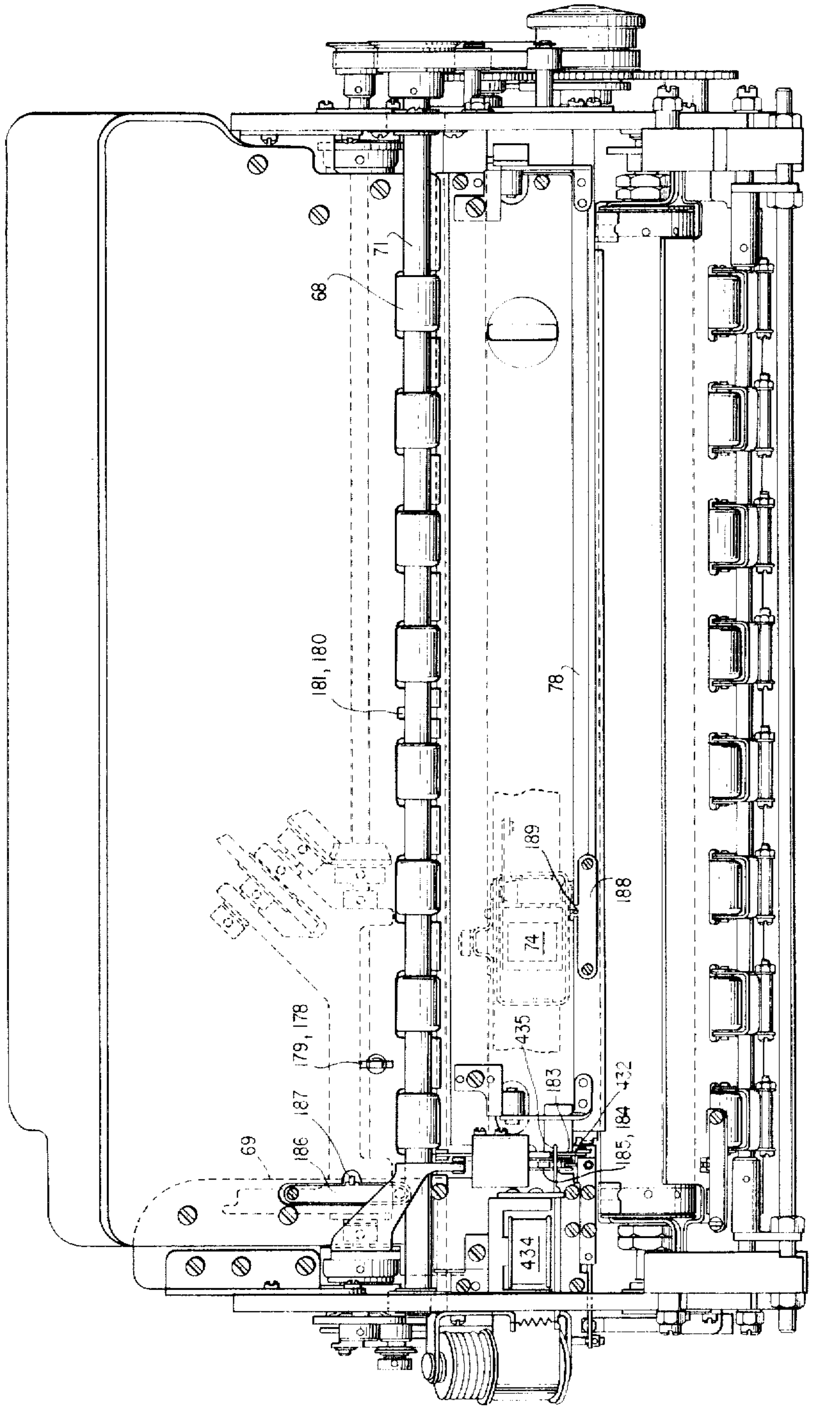
Figure 7:
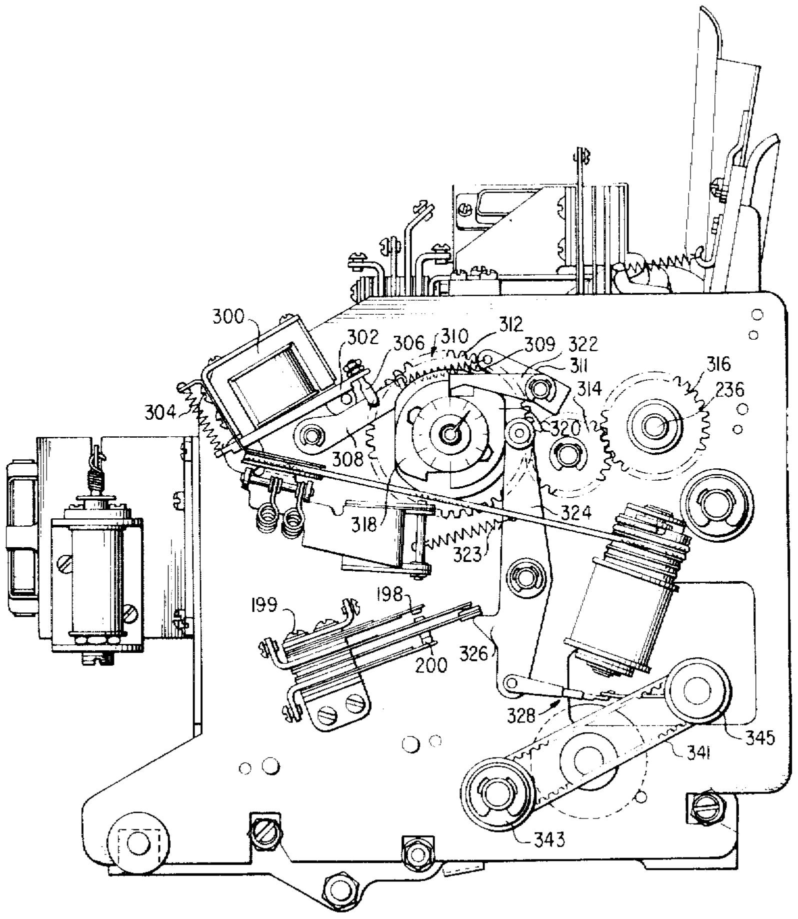
Figure 8:
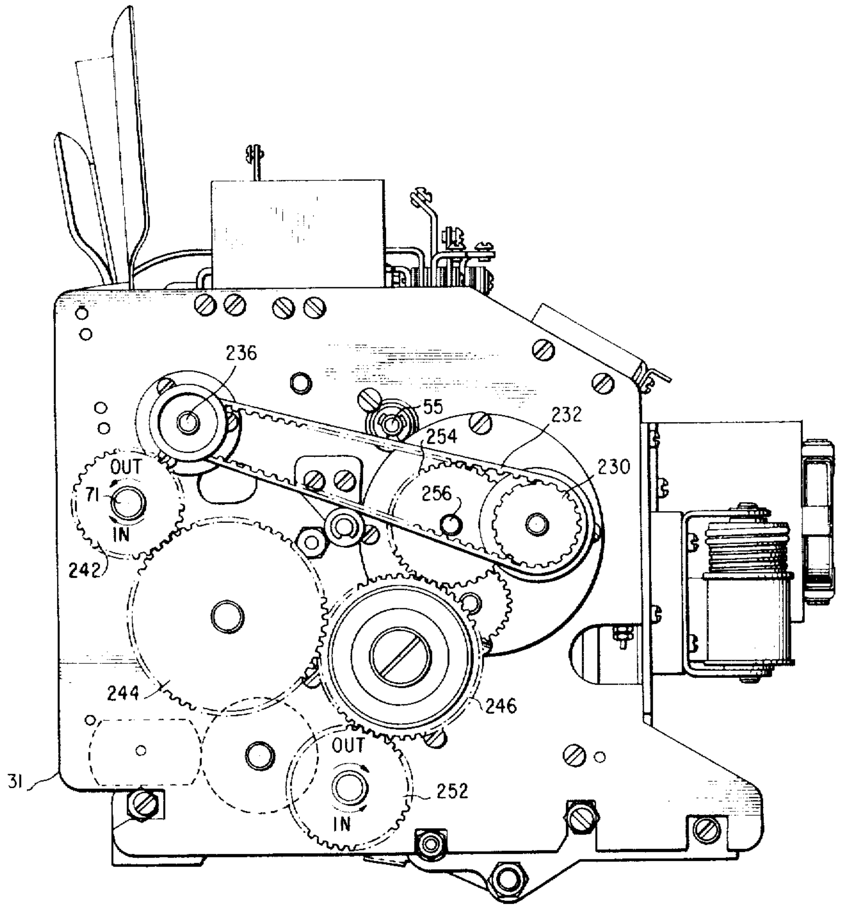
Figure 9:
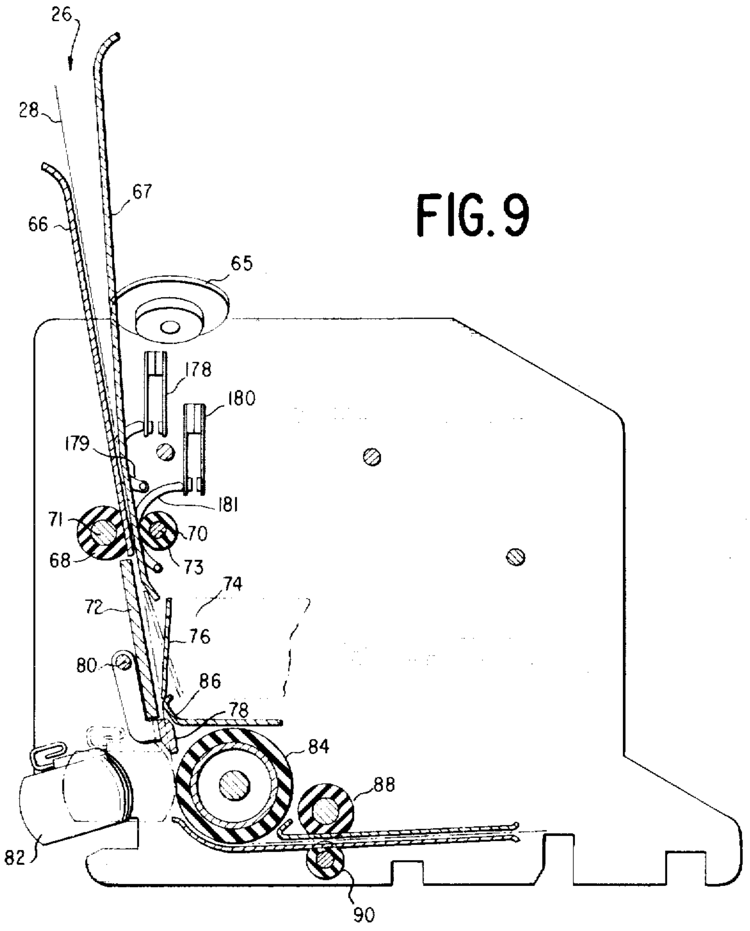
Figure 10A:
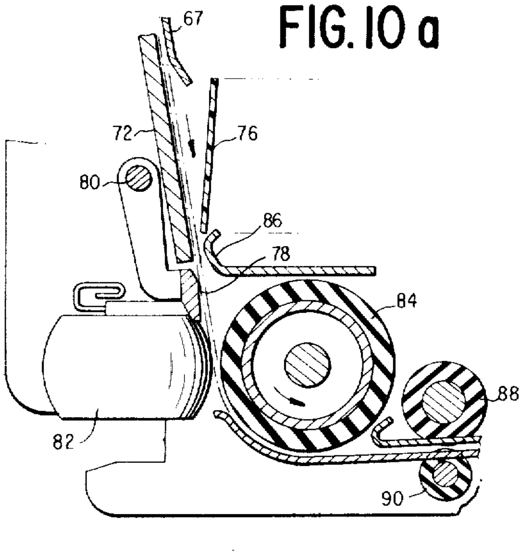
Figure 10B:
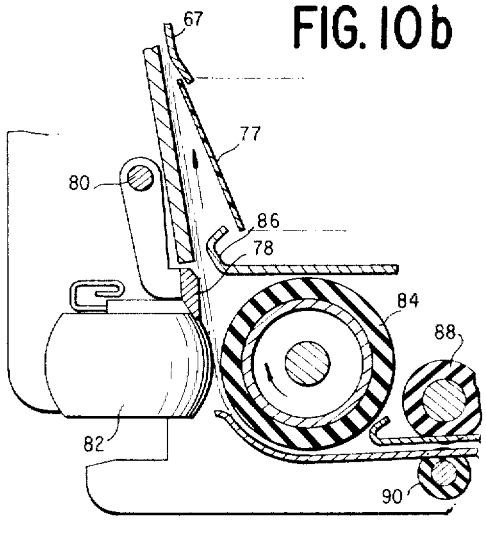
Figure 11:
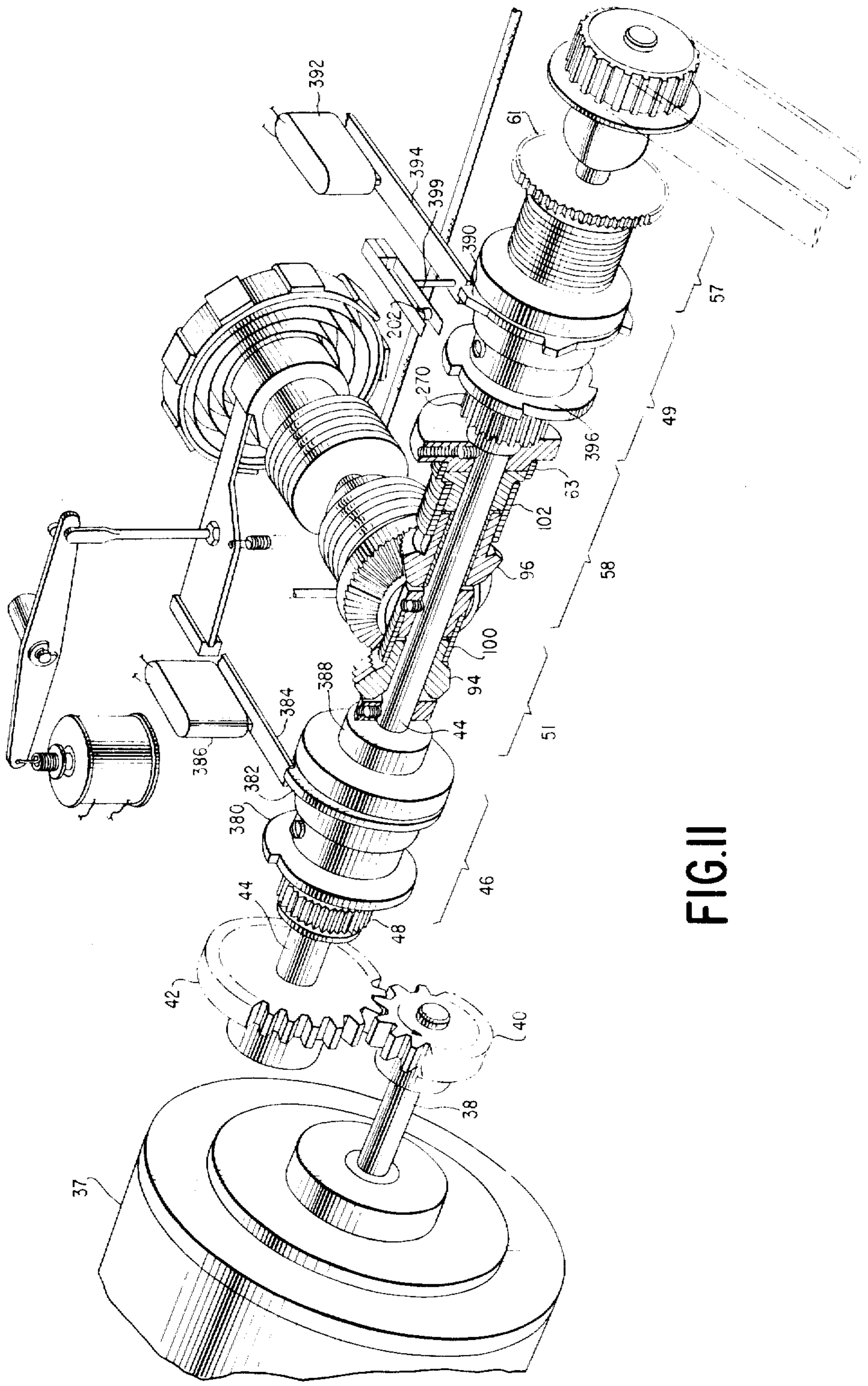
Figure 12:
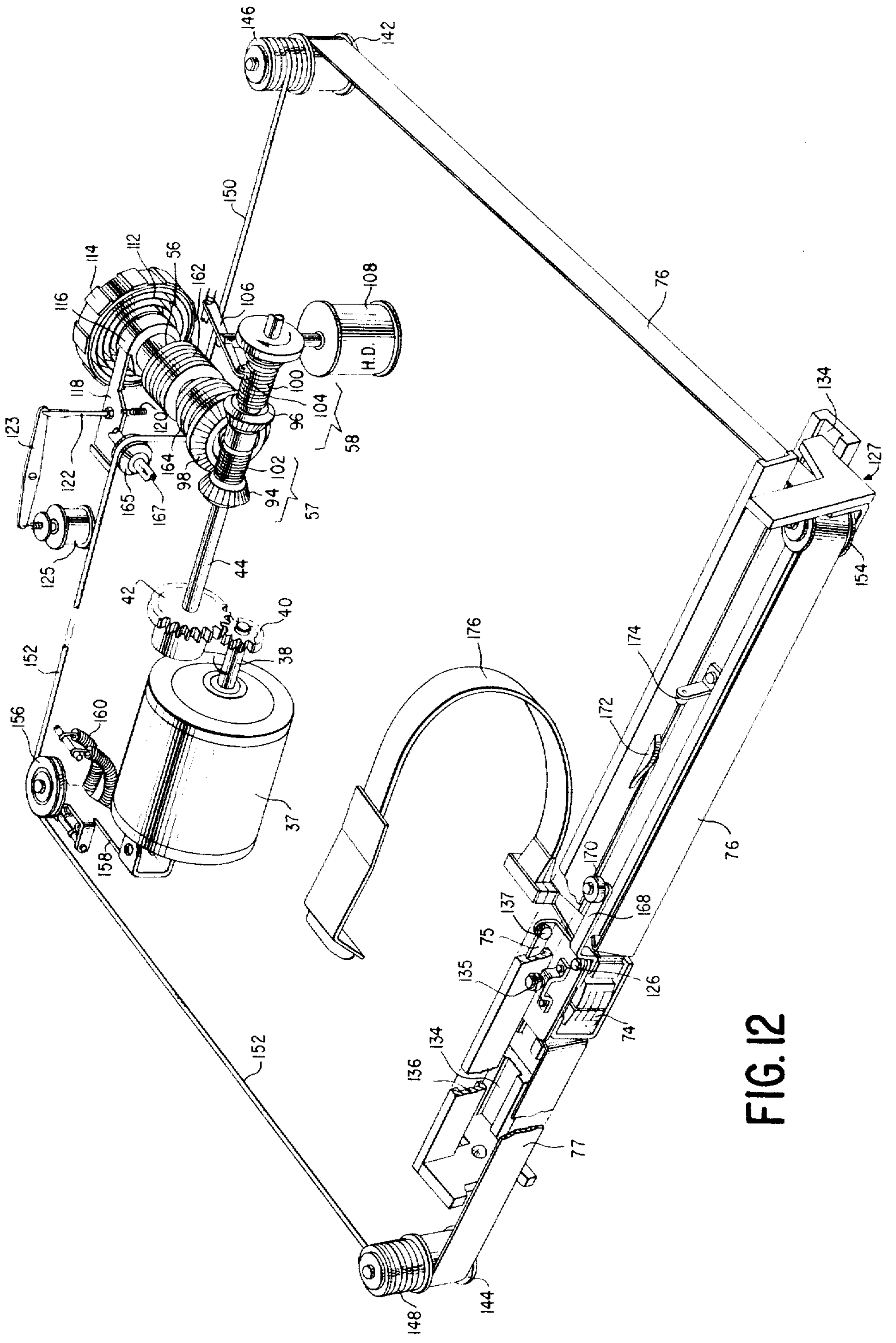
Figure 13:
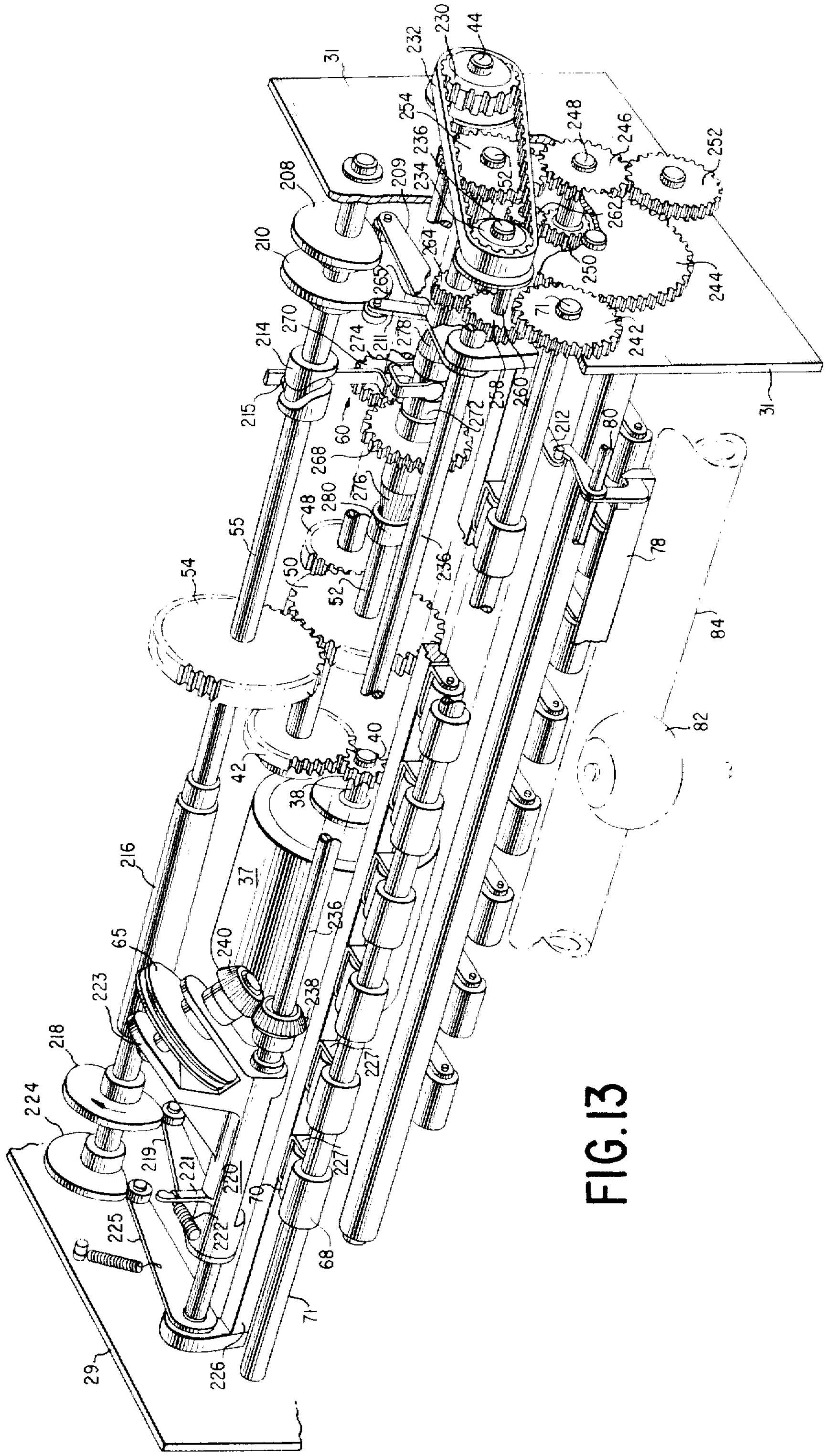
Figures 14, 15:
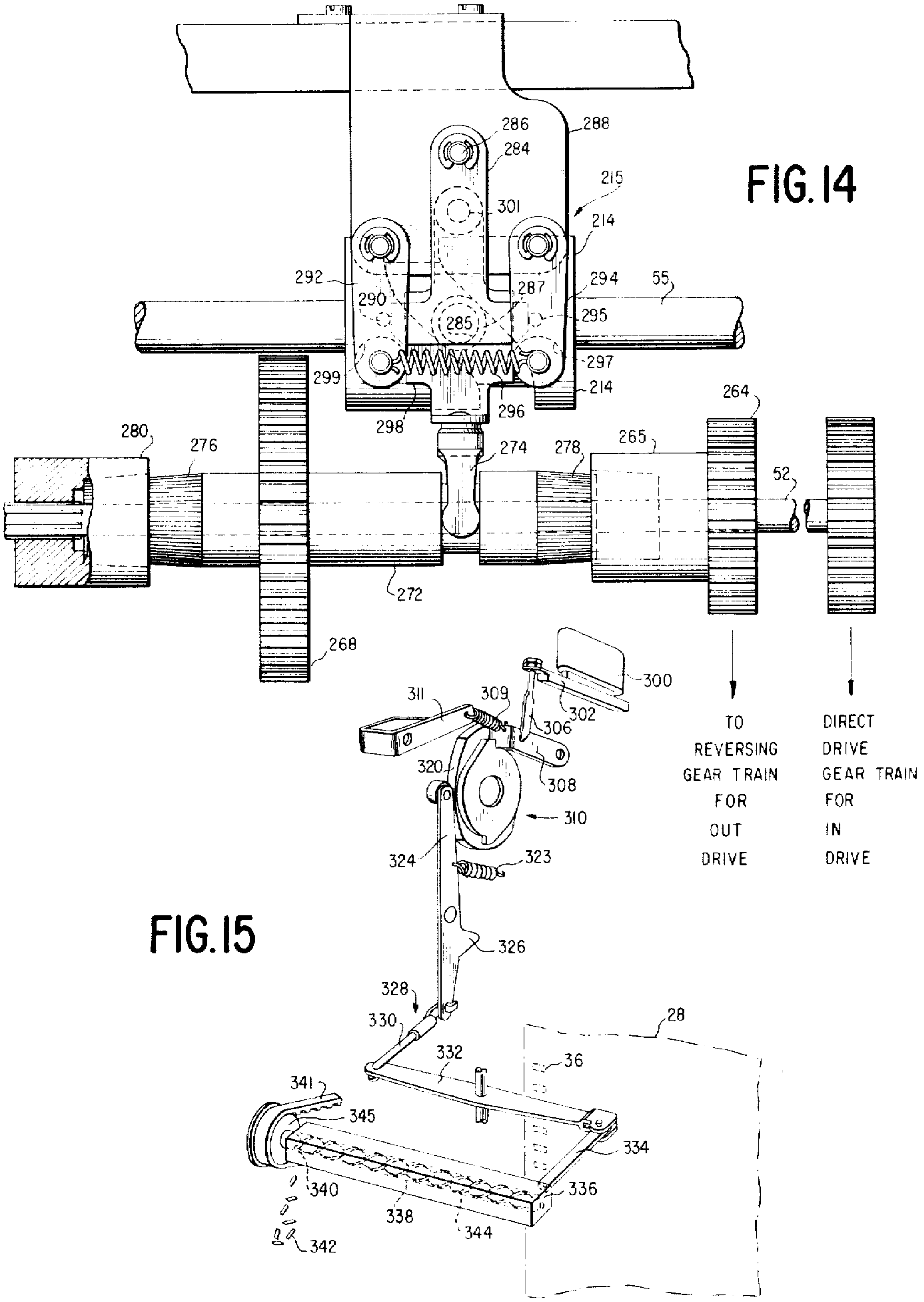
Figure 16:
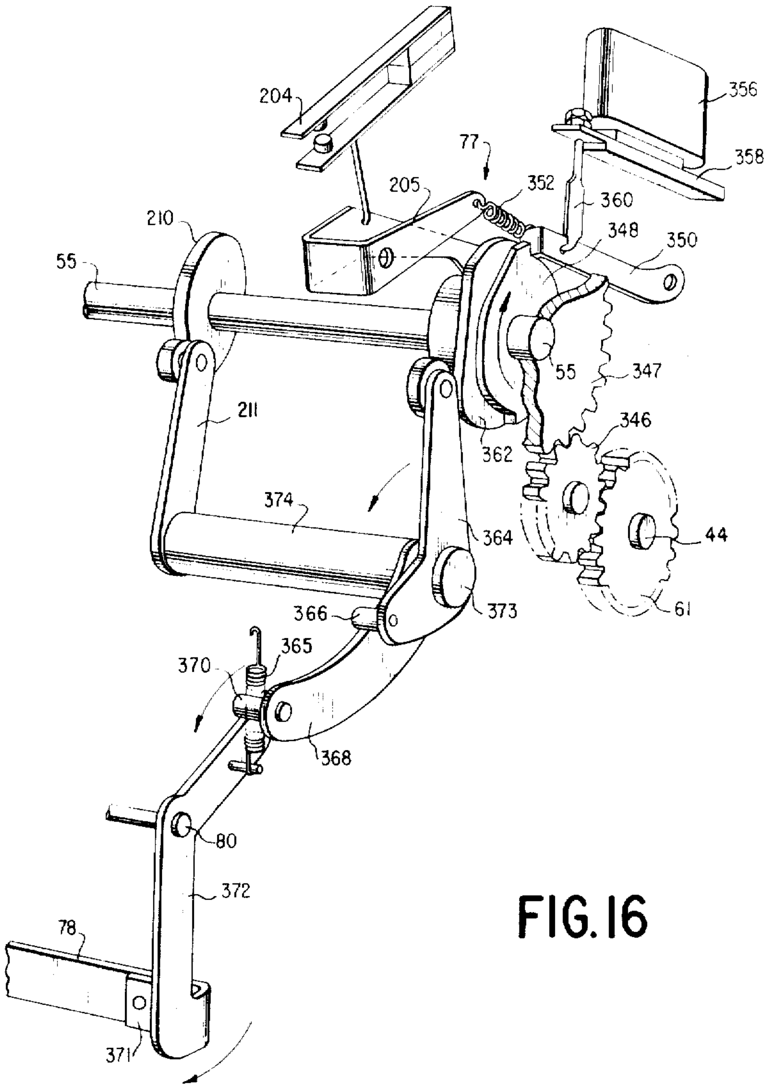
Figures 17, 19:
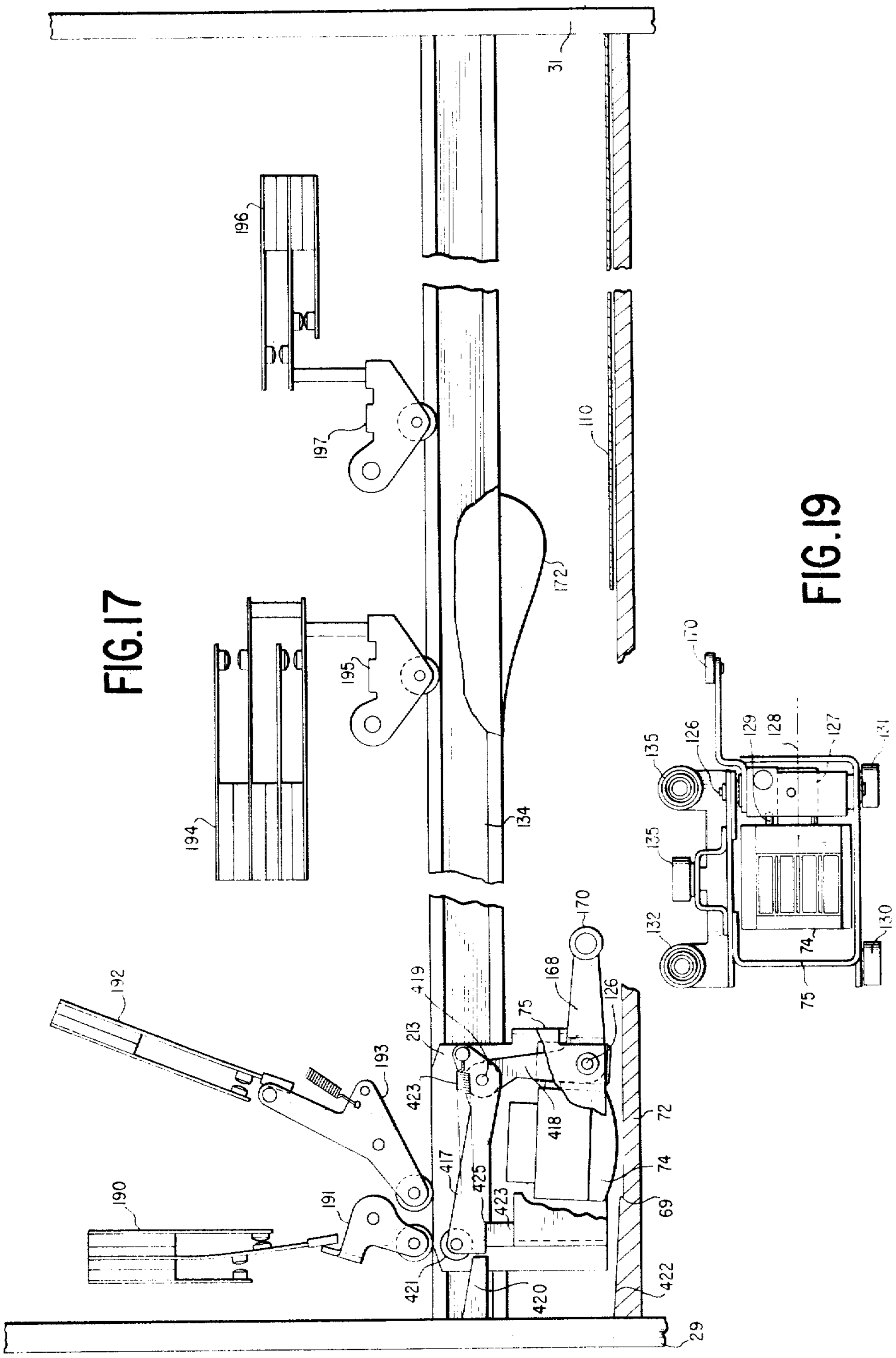
Figure 18:
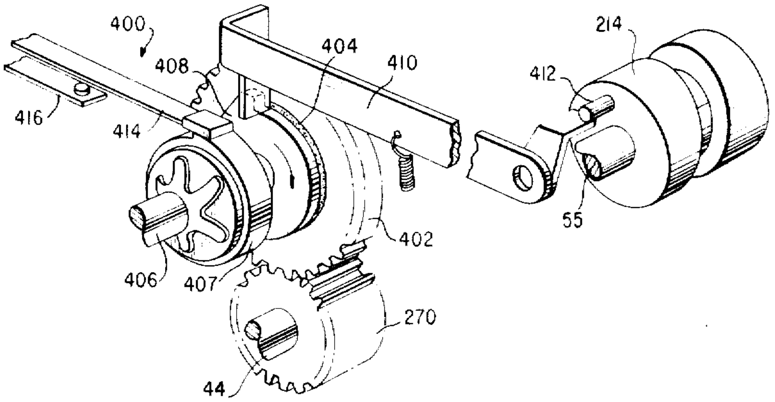
Figures 20A, 20B:
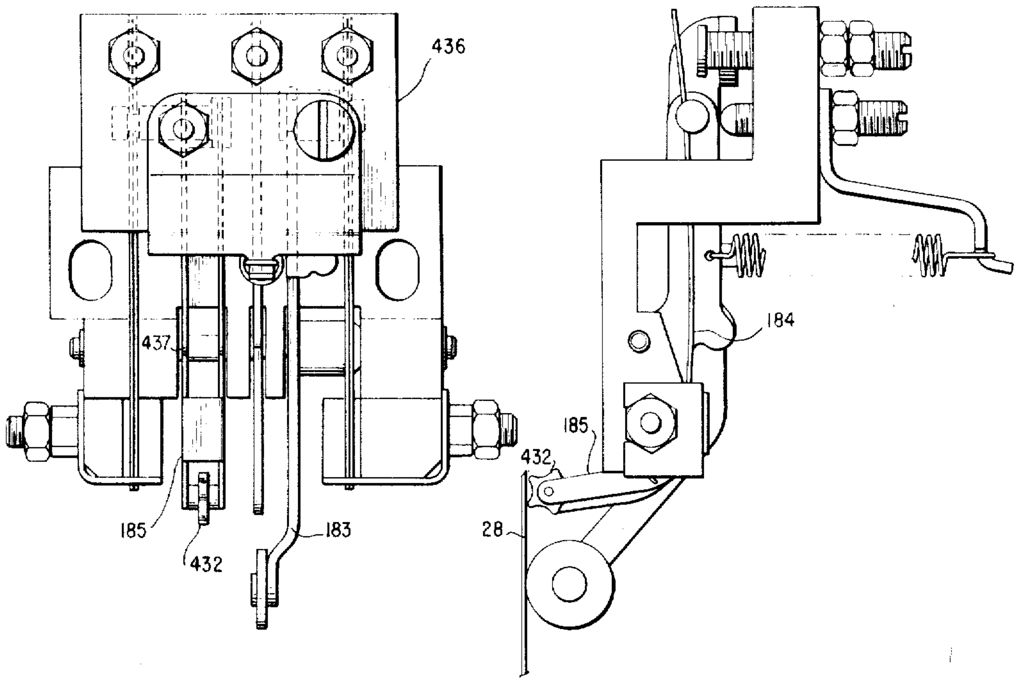
Figure 21:
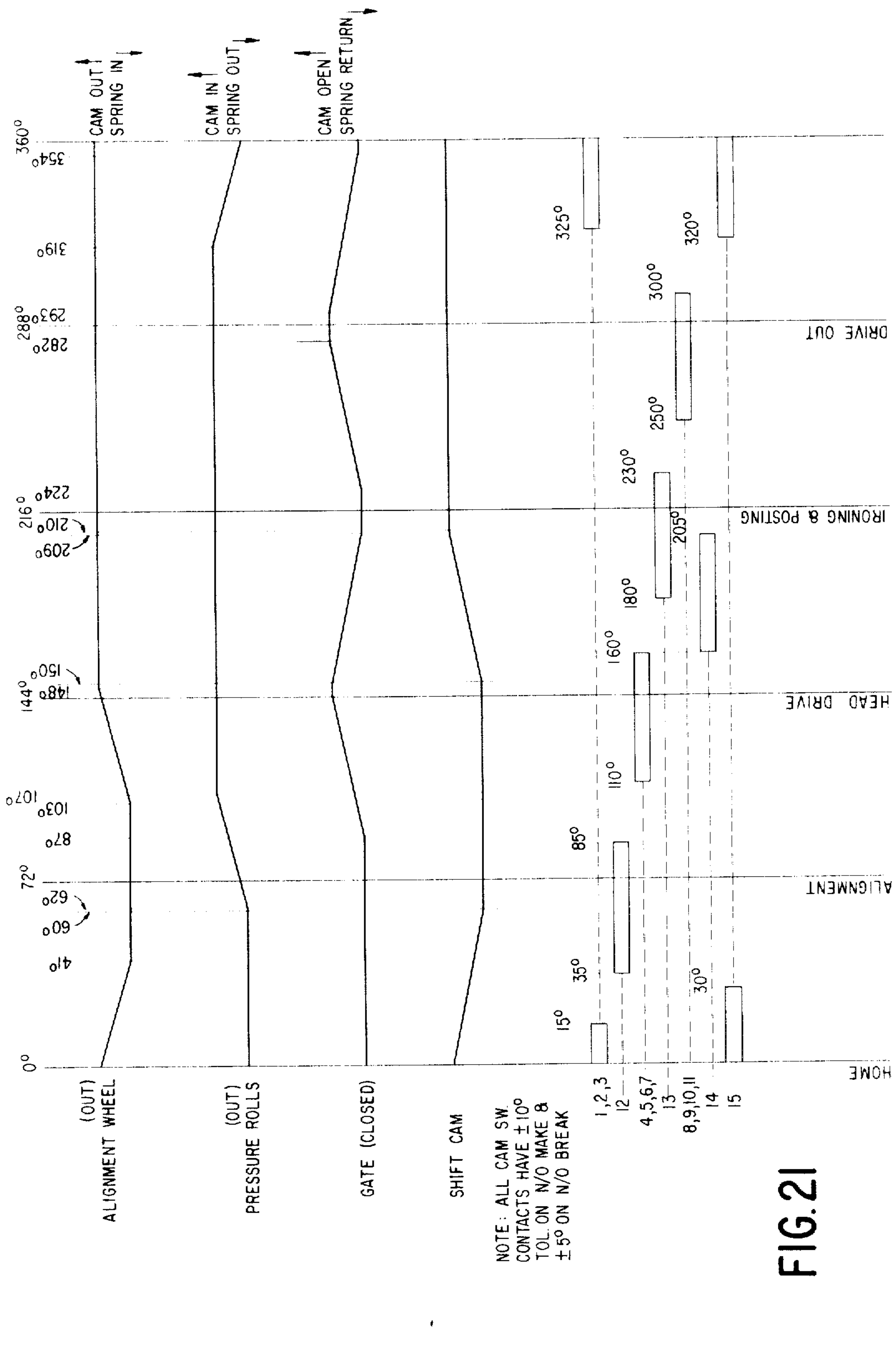

FIGURE 3*a* is a representation of the magnetic stripe or track on the back of the magnetic ledger card at the start of the record;

FIGURE 3*b* is a further representation of the magnetic ledger card track near the end of the record;

FIGURE 4 is a block diagram of the magnetic ledger card system as related to the electronic and mechanical accounting system;

FIGURE 5 is a top plan view of the magnetic ledger card machine;

FIGURE 6 is a front elevation view of the magnetic ledger card machine;

FIGURE 7 is an end elevation view from the left end as viewed from the front as in FIGURE 6 of the magnetic ledger card machine;

FIGURE 8 is an end elevation view as viewed from the right end from the front as in FIGURE 6;

FIGURE 9 is a simplified sectional elevation through the machine illustrating card feeding and guiding;

FIGURES 10*a* and 10*b* are schematic illustrations of card guiding IN feed and OUT feed respectively;

FIGURE 11 is a perspective view of the clutch shaft and operators therefor;

FIGURE 12 is a perspective view of the head drive assembly;

FIGURE 13 is a perspective view of the card feed drive and power train including the cam line shaft;

FIGURE 14 is a front elevation of a detail of the reversing clutch and cam follower actuator;

FIGURE 15 is a perspective view of the chad removal assembly and a portion of the punch assembly;

FIGURE 16 is a perspective view of the index clutch and associated linkage for operating the gate;

FIGURE 17 is an illustrative top plan view of the head, head carrier, guide track and associated switches;

FIGURE 18 is a perspective view of the full card clutch;

FIGURE 19 is a front elevation view of the head and head carrier;

FIGURE 20*a* is a front elevation view and FIGURE 20*b* is a side elevation view of the line sense switch and card sense switch assembly;

FIGURE 21 is a timing diagram; and

FIGURES 22*a*, 22*b*, 22*c*, 22*d* are circuit diagrams of the relay and switch circuits for operating the machine in its predetermined sequence.

*Introduction*

In general, the magnetic ledger card machine includes a magnetic ledger card handling unit mounted on a commercially available model 735 IBM input-output typewriter (used for output operations only in this invention) and the magnetic ledger card machine may be used as an input-output mechanism for an accounting system.

In order to understand the basic concept of the magnetic ledger card machine of this invention, it is necessary to consider the operations of the machine in sequence, which are as follows:

(a) An operator inserts a magneic ledger card into the machine with the magnetic stripe at the rear and the face of the card to be printed facing the front of the machine.

(b) The machine automatically aligns the magnetic ledger card by feeding it to a reference position where it is then clamped with the magnetic stripe on the card in position for a magnetic transducing operation.

(c) After the magnetic ledger card is clamped, magnetically recorded information is read by a pass or scan of a movable magnetic head thereover and the coded information read may be transferred to a memory of another machine in the accounting system.

(d) After the magnetic read scan, the magnetic ledger card is fed on in toward a typing or print station.

(e) The next posting line hole or the top of the card is sensed and the magnetic ledger card is stopped in a predetermined position relative to the print station so that it may be updated by printing thereon by the typewriter.

(f) After posting (printing on the card by the typewriter) a new posting line sense hole is punched.

(g) The magnetic ledger card is then fed back out from the print station toward the magnetic transducing station.

(h) The machine senses when the card in its out feed reaches the magnetic transducing station and the out feed drive is stopped.

(i) The magnetic ledger card is realigned at the magnetic read-write station.

(j) The magnetic ledger card is clamped and new coded information (from the accounting system, for example) is magnetically recorded thereon.

(k) The newly recorded information is checked by another read scan of the transducer head across the card.

(l) The magnetic ledger card is then ejected to its removal position for removal by the operator.

(m) After the card is removed by the operator the machine cycles itself to home position ready to receive another ledger card.

This invention relates only to the magnetic ledger card machine and its components including relay logic circuitry for providing the sequencing of the mechanical card handling magnetic transducing (read/write functions), print out and punch operations. The remainder of the accounting machine system is not part of this invention but is a portion of other pending applications assigned to the assignee of this invention. See IBM Docket No. 11,101 and Docket No. 11,103.

The magnetic ledger card machine is self contained and has its own continuously rotating drive motor. The motor drives a clutch shaft and various operations and functions are obtained by operating these clutches and various mechanical and relay switches in a predetermined sequence.

The various clutches control the following: A cam line shaft, rotated in steps to various angular positions; a head drive assembly, to drive the head across the magnetic ledger card for scanning read-write operations; a card feed assembly to control the IN and OUT feeding and positioning of the magnetic ledger card; a head clutch to latch the head drive assembly at certain points in the cycle; a punch clutch to control the punching of a new posting line sensing hole; and an index clutch to open a card gate during single line index.

In addition to the clutch controls, the cam line shaft carries a number of cams for sequencing operations. These cams are as follows: pressure cams, to control movement of pressure rolls against upper feed rolls; an alignment cam to control an alignment wheel position; a gate cam to control card gate position; a shift cam to control the direction of card feed through the card feed clutch; and switch cams to assist in logical control of the sequence of operations.

The position of the movable magnetic head is sensed by switches operated by a head carrier during its travel. These switches include a "head home" switch, an "on track" switch, a "head latch" switch and an "end of head sweep" switch. The position of the magnetic ledger card is sensed at various points in the cycle by a number of card operated switches including; a card presence upper switch, a card presence lower switch, a card sense switch. For index purposes there are also a punch switch, an index switch and a card feed switch in addition to fifteen cam switches operated by the switch cams.

The various clutches, switches, cams and additional relays and circuits are all mechanically and electrically related to accomplish the sequence of functional operations described above.

*System in general*

FIGURE 1 is a perspective view of an entire accounting machine system 10. The accounting machine system includes a calculator element 12 with a primary printer 14 and a paper handler 16 as well as a keyboard 18, function buttons 20 and numeric keyboard 22. Adapted to operate with the primary calculator is a magnetic ledger card handling unit 24 which is the subject of this invention. The primary calculator unit and the electronic system and controls therefor are the subjects of other applications assigned to the assignee of this invention as mentioned above.

The magnetic ledger card unit 24 includes a printing system as well as a card handling system inside the enclosed cabinet as was shown in the other drawings. The only portion visible from the top of the enclosed cabinet is a feed throat 26 for feeding in and removing magnetic ledger cards such as card 28 shown in detail in FIGURE 2 and illustrated in FIGURE 1 as being carried in a movable cart 30.

As shown in FIGURE 2, the magnetic ledger card 28 includes a printed matter 32 (such as a heading and ledger lines) and a magnetic stripe 34 on the reverse side of the card. Along one edge of the card line sensing holes 36 may be punched in accordance with the number of lines previously printed on the card.

The magnetic tape stripe on the reverse side of the card is shown with coded information recorded thereon in FIGURES 3*a* and 3*b*. As shown in FIGURE 3*a*, the system is first readied for recording prior to starting the particular data recording and the code used is a six bit code as explained in the companion applications referenced above. The system is able to handle alpha and numeric information as indicated. The code is recorded in four separate horizontal tracks as shown in FIGURE 3*b* including three record tracks for the six bit code and a check track for an odd parity check code.

FIGURE 4 is a block diagram of the accounting system including the magnetic ledger card machine of this invention. The calculator unit 12 including an internal memory, the print out unit 14, keyboard 18, as well as the other keyboards (input-output devices) is indicated generally by block 11 and as mentioned above is the subject of copending applications assigned to the assignee of this application. Information may be fed to and from the calculator memory and input-output devices to an input-output register and controls 13. The input-output register and controls, controls a print function translator 15 which in turn may control a printer 17 for the magnetic ledger card. The printer 17 may be a commercially available IBM typewriter such as sold under the trademark "SELECTRIC." Also, connected to the input output register 13 is a unit indicated diagrammatically at 19 to control magnetic reading and writing operations on the magnetic ledger card (MLC) as well as scanning of a magnetic head assembly 21 which is tape driven about spools across the magnetic stripe 34 on the magnetic ledger card 28. The magnetic ledger card itself is fed in opposite directions and correctly positioned by a drive unit indicated generally at 23.

In typical operation of the accounting system 10 FIGURE 1, including the magnetic ledger card unit 24, the operator would insert the ledger card 28 into the throat 26 of the ledger card unit and a document would be in the primary printer 14 of the calculator. The information recorded on the magnetic ledger card is automatically read into the calculator memory and with no keyboard activity alpha and numeric information may be printed on a document in the calculator by printer 14 at maximum printer speed. This information may include the name and address as well as the old balance. An operator may then key additional information pertaining to the transaction using keyboards 18, 20 and 22, and all calculations will take place within the calculator 12 and circuits 11 automatically. The entered and the calculated data will then be passed out through the calculator, through the input-output register and controls 13 and into the print function translator 15 to print out by the printer 17 on the magnetic ledger card 28 which has been positioned by the drive 23, see FIGURE 4. At the conclusion of the operation, the transaction data to be carried with the account, such as a new balance, together with all the fixed alpha and numeric data for the account, will be magnetically recorded on the stripe 34 on the magnetic ledger card, and then checked. The card 28 will then be ejected to a position from which the operator may withdraw and refile it and the magnetic ledger card machine 24 of this invention will automatically recycle itself to accept another ledger card.

*Magnetic ledger card unit in general*

FIGURE 5 is a top view of the card handling portion of the magnetic ledger machine 24 of this invention. The machine includes a chassis 27 which comprises a left side plate 29, a right side plate 31, and a number of horizontal cross supports such as horizontal support 33 and back cross rail 35, as well as suitable intermediate vertical supports such as vertical support plate 45 for suitably supporting the various elements to be described. The motive power for both card handling and head drive is from a drive motor 37 which is continuously running during machine operation. The drive motor 37 includes a drive shaft 38, and shaft 38 has a pinion 40 thereon for driving a gear 42 secured to a clutch shaft 44.

The clutch shaft 44 carries a number of separate clutches shown in more detail in FIGURE 11, including a cam shaft clutch 46. A pinion 48 on the cam shaft is in mesh with an idler gear 50 on a shaft 52 which in turn is in mesh with an output gear 54 on a five position cam shaft 55.

A head drive shaft 56 is part of a head drive clutch assembly 58 shown better and in more detail in FIGURE 12. A card feed assembly 60 is also shown in more detail in FIGURE 9. When a magnetic ledger card is in the card feed throat 26 it may be driven diagonally downward by an inclined card aligning assembly 62 to its aligned position referenced by one edge and the bottom of the card. A punch mechanism 64 is positioned on the left side of the machine and this is shown in more detail in FIGURE 15.

*Clutch shaft assembly and clutch operators*

As best shown in FIGURE 11 of the drawings, and as described in general above, clutch shaft 44 is continuously driven by motor 37 through motor shaft 38, pinion 40 and gear 42. The shaft is supported by a bearing in plate 45, FIGURE 5, and adjacent to the bearing is the gear 48 which is clutchable to the clutch shaft by means of a cam line clutch 46 to furnish the drive for the cam line shaft 55, FIGURE 5, through the idler 50. The cam line clutch 46 is a dog type clutch with internal dogs (not shown). The clutch includes from left to right, a check ring 380 contacted by a check pawl underneath the cam and not visible in FIGURE 11, and a release ring 382 adapted to be contacted by a clutch stop finger 384 which, in turn, is under the control of a cam line clutch solenoid 386. A drive ring 388 is attached to the cam line shaft 44 so that when the clutch is in engagement there is a drive from the cam line shaft 44 to the gear 48.

Adjacent the cam line clutch 46 on the cam shaft is a head return governor 51 including a governing spring 100 and a bevel gear 94. Similarly, head drive clutch 58 includes bevel gear 96 and spring clutch 102 described in more detail in connection with the head drive assembly. The head drive clutch 58 also includes a shock unloader 63.

A card feed drive pinion 270 of substantial width is clutchable to the clutch line shaft 44 to furnish drive for feeding the magnetic ledger card both IN and OUT. The card feed pinion 270 is selectively clutched to clutch line shaft 44 by another dog type clutch, card feed clutch 49. The card feed clutch 49 is similar to the cam line clutch 46, the difference being that a release ring 390 of the card fed clutch has additional stopping surfaces thereon. The card feed clutch 49 is operated from a card feed control solenoid 392 through a stop pawl 394. A pawl for check ring 396 of the clutch is not visible in FIGURE 11, being underneath the clutch line.

A feed drive overload clutch 57 includes as a component thereof an index clutch drive gear 61 for driving an index clutch freely rotatable on the cam shaft 55 through an idler gear 346, as shown in FIGURE 16.

A full card clutch 400 as shown in FIGURE 18 is driven from the feed drive pinion 270 as is the card feed power train to be described hereinafter.

A stop pawl 394 operates a pin 399 for controlling a normally closed card feed switch 202 mounted on the frame of the unit.

*Card Feed Assembly*

The path of the magnetic ledger card fed into and handled by the machine is best shown in FIGURE 9. As shown, a magnetic ledger card 28 is positioned in throat 26, FIGURE 1, which throat includes a front side 66 and a rear side 67. A rotating aligning wheel 65 is selectively movable into contact with the card 28 to drive the same to reference it against the bottom edge and left side. The stop for the left side reference position is aligning throat edge block 69 while the stop for the bottom of the card is a movable gate 78, see FIGURE 6. Gate 78 is movable on a pivot rod 80, FIGURE 9, to selectively swing out of the card path and allow feeding of the card 28 below the gate.

Card feeding is accomplished by a series of upper feed rolls 68 mounted on shaft 71 which is selectively driven in opposite directions. Pressure is selectively applied against feed rolls 68 by pressure rolls 70 mounted on shafts 73 for swinging movement toward and away from a position to apply pressure to a card against the feed rolls.

Below the upper pressure roll and feed roll is a read-write surface 72 and adjacent the read-write surface is a magnetic transducing head 74, see FIGURES 12 and 17, which may be driven by a drive tape 76. The card is referenced by the gate 78 and edge guide 69 so that the magnetic head 74 will traverse the back side of the card as it abuts backup recording plate 72 at a predetermined position which corresponds to the magnetic stripe 34 on the card and is termed the magnetic transducing station.

Below the movable gate 78 is a printing station including a print head 82 of a single print element typewriter such as the IBM "SELECTRIC." A print platen 84 is the print platen of the typewriter and above the print platen 84 is a ledger guide plate 86. A series of lower pressure rolls 90 is adapted to apply pressure to a series of lower feed rolls 88 for feeding a ledger card to a predetermined position around the print platen 84 and for feeding the card back out from the print station toward the magnetic transducing station.

For selectively rotating the upper and lower feed rolls 68 and 88 in either forward or reverse directions, a power train assembly is provided and this is best shown in FIGURE 13. Movement of the upper pressure roll 70, the aligning wheel 65 and the gate 78 is under the control of cams on cam shaft 55 to be described in detail hereinafter.

Referring to the power train of FIGURE 13, attached to the outer end of continuously rotating clutch shaft 44 is a clutch shaft gear 230. Toothed pulley belt 232 is trained around continuously rotating gear 230 and a gear 234 on an aligning wheel drive shaft 236 to continuously rotate shaft 236. Secured to shaft 236 is a bevel gear 238 in mesh with a bevel gear 240 which, in turn, is rigid with a drive shaft for continuously rotating aligning wheel 65. Thus, aligning wheel 65 is continuously driven from motor 37 through the clutch shaft 44, belt 232 and aligning shaft 236.

The upper feed rolls 68 on feed roll shaft 71 are driven by upper feed roll pinion 242 in mesh with an idler 244. An idler pinion 246 is on the outer end of idler shaft 248 and another idler pinion 250 is on the inner end of shaft 248. The drive shaft for the lower feed roll 88, FIGURE 9, includes a lower feed roll drive gear 252, FIGURE 13, in mesh with idler 246 to be driven in either direction. An IN drive control gear 254 is on the outer end of the shaft 52 and, when the shaft is driven in a counterclockwise direction, this will furnish the drive for upper and lower feed roll drive gears 242 and 252. When a shift cam 214 is rotated to the OUT drive position, out-drive pinion 264 is clutched to the drive and this is in mesh with idler gear 258 on idler shaft 260, and the other end of shaft 260 carries an idler pinion 262 in mesh with gear 250 which, in turn, is on the shaft 248 carrying gear 246 in the gear train.

The shifting assembly (FIGURES 13 and 14) includes a shiftable card feed gear 268 loosely mounted on shaft 52 and always in engagement with feed pinion 270, FIGURE 11. A shiftable bushing 272 (an extension of gear 268) also is loose on shaft 52 and is adapted to be engaged by a shift yoke 274 for axially moving the bushing 272 on shaft 52 in one direction or the other. On one end of the bushing 272 is an IN drive spline 276 while on the other end of the bushing is an OUT drive spline 278. An IN drive hub 280, adapted to be drivingly engaged by IN drive spline 276, is nonrotatably connected to drive control shaft 52 while an OUT drive hub 265 (an extension of OUT drive pinion 264) and loose on shaft 52. It can be seen that by shifting the yoke 274 in one direction or the other from the neutral position shown in FIGURE 14, one or the other of the drive hubs, 280 or 265, will be engaged to either drive the IN drive gear 254 or the OUT drive gear 264 in the same direction. The OUT drive gear 264 is in mesh with the gear train through the reversing gear train including idlers 258 and 262 on reversing shaft 260, while the IN drive gear 254 is in direct engagement with gear 246, the feed direction is not reversed when hub 280 is clutched.

The shifter element per se is also shown in FIGURE 14. The shifting element includes a cam follower arm 284 with a cam follower pin 285 mounted on the underside thereof and projecting through a hole 287 to engage the groove of shift cam 214 on cam line shaft 55. Arm 284 is mounted for pivotal movement about pivot pin 286 from support bracket 288 so movement of the cam causes cam follower pin 285 to follow the movements of the cam. The cam follower arm 284 includes projecting edges which abut against depending studs 290 and 295 mounted on the under sides of pivoted idler arms 292 and 294, respectively, depending on the direction of motion of the cam follower arm 284. The idler arms 292 and 294 are connected together by a spring 296 and, in addition to depending studs 290 and 295, the idler arms 292 and 294 also include depending pins 297 and 299 contacting the edges of a movable shifter yoke support 298 which is pivoted about point 301 from support 288 and is attached at its lower end to shifting yoke 274.

Assuming that the shift cam 214 causes the follower pin 285 to move to the left as shown in FIGURE 14 within the hole 287, the edge of the arm 284 moving to the left would abut against stud 290 and move idler arm 292 to the left thus stretching spring 296 and tending to cause idler arm 294 to follow. Depending post 297 of idler arm 294 would contact the right hand edge of yoke bracket 298 and tend to urge it in the same direction (to the left) but in an impositive manner as the only direct connection is through the spring 296. This arrangement provides for allowable tolerances in the mechanical construction.

*Cams on cam line*

Cam line 55 has a number of cams thereon for various functional purposes as referred to in general above. These are best shown in FIGURE 13 of the drawings. Referring to FIGURE 13, the cam line shaft 55 has a pressure roll cam 208 secured to the right-hand end thereof and a similar pressure roll cam 224 secured to the left hand end thereof. Cam 208 operates a follower 209 and cam 224 operates a biased follower 225 which followers are attached to pressure roll bar 226 which, in turn carries the pessure rolls 70 individually biased within pressure roll holders 227. Thus the cams 224 and 208 control the pressure rolls 70 in their movement toward or away from the feed rolls 68 on feed roll shaft 71.

A gate cam 210 is adjacent pressure cam 208 and is followed by a pivoted gate cam follower 211. The gate cam and follower are best seen in FIGURE 16. The gate cam 210 and follower 211 operate to move the gate 78 to an open position. The gate cam 210 may be overridden by an index clutch cam as will be described in connection with the index clutch 77 shown in FIGURE 16.

The grooved shift cam 214 operates a cam follower assembly 215 in an arrangement disclosed in detail in connection with FIGURE 14 and as previously described. The function of the shift cam is to shift the gear train to rotate the feed rollers in a direction to feed the card IN or OUT.

Cam 216 indicated in FIGURE 13 is actually 15 different cams, which have not been shown in detail for the sake of simplicity. These 15 cams operate switches (not shown in FIGURE 13) in a time and angle controlled fashion as is indicated in the logic circuitry to be described.

Alignment cam 218 on cam line 55 operates a pivoted cam follower 219 rigidly attached to bushing member 220 loose on shaft 236. A projecting arm 221 functions as a connection for spring 222 to bias aligning wheel 65 against a card in the throat. The member 220 also includes a yoke 223 for rotatably supporting continuously driven aligning wheel 65. Thus, the position of cam 218 controls whether or not the continuously rotating alignment wheel 65 is in or out of contact with a magnetic ledger card in the throat to drive the card to alignment in magnetic transducing position.

*Control and indexing switches*

As noted above, a plurality of switches are operated by the position of the magnetic ledger card 28, head carrier 75, FIGURE 17, and cams on the cam line 55 to control, together with other relays, the sequence and the operation of the machine 24.

These switches include a normally open card present upper switch (CPU) 178 shown in FIGURE 9 which senses the presence of a card 28 in an upper position. This switch is operated by an operating arm 179 extending into the card feed path. A card present lower switch (CPL) 180 is also shown in FIGURE 9 and it includes an operator arm 181 extending into the feed path in a lower position to be operated by a card just above the feed and pressure rolls 68 and 70 shown in FIGURE 9.

A card sense switch 182 is positioned in the card feed path below the level of the card feed rolls and includes an operator arm 183 as shown in FIGURES, 6, 20*a* and 20*b*. Similarly, a line sense switch 184 with an operator arm 185 including a star wheel 432 is positioned adjacent the card sense switch 182 in vertical alignment with the position of holes 36, FIGURE 2, to be punched in the card so the line sense switch 184 senses either the top or bottom of a card 28 or any holes 36, FIGURE 2, punched therein.

A normally open side switch 186, FIGURE 6, is mounted in the side guide block 69 and includes an operator arm 187 so that it will operate when the card is between .008 in. and .012 in. from the guide block 69. A normally open gate switch 188 is mounted in the gate bar 78 as shown in FIGURE 6 and is similar to side switch 186 in construction and includes a similar operator 189. When a card is aligned in the throat against the side 69 and gate 78, both normally open switches 186 and 188 will be closed.

The head carrier 75 as shown in FIGURE 17 includes a camming surface 213 thereon to operate four switches depending on the position of the head carrier 75. These switches include a head home transfer switch 190 operated by a pivoted trailing roller follower operator 191. A normally closed on track switch 192 is controlled by biased pivoted trailing type operator 193 and is held open by the head carrier 75 in its home position. At the right end of the track as viewed in FIGURE 17 is a head latch switch assembly 194, which includes a pair of normally open contacts and is operated by a pivoted trailing type roller follower 195. Adjacent the head latch switch is an end of head sweep switch 196 of the transfer type again operated by a pivoted trailing roller follower 197.

Referring now to FIGURE 7 a punch switch assembly 199 includes a transfer switch with normally open contacts 198 and normally closed contacts 200. Card feed switch 202 is operated from the card feed clutch and is shown in FIGURE 11. A normally open index switch 204 is operated from a check pawl 205 from an index clutch assembly 77, shown in FIGURE 16.

In addition, there are fifteen cam operated switches 206, FIGURE 5, with appropriate terminals 207. These switches are mounted to be actuated by fifteen switch cams 216 on cam line shaft 55, see FIGURE 13. Thirteen of the fifteen switches are for indicating the cam line angular position. The fourteenth is a "ledger post" contact to in effect inform the calculator that the posting line has been reached while the fifteenth contact O′ is a "return the machine to rest position" contact.

*Head drive assembly*

After the card is in aligned position for reading, the head drive assembly shown in FIGURE 12 may be operated to drive the head for a sweep or scan across the magnetic stripe 34 on the back of card 28 (FIGURE 2). The head drives from the clutch drive shaft 44 carrying a pair of bevel gears 94 and 96 adapted to be clutched thereto. The bevel gears 94 and 96 are free running on clutch shaft 44 and are always in mesh with a bevel gear 98 on head drive shaft 56.

The bevel gear 96 being loose on the clutch shaft and in mesh with bevel gear 98 may be selectively clutched to clutch shaft 44 to drive bevel gear 98 and head drive shaft 56 in one direction. Head drive clutch 58 includes a wrap-up spring 100 which may be actuated by a shoe 104 on the end of a bevel gear 106 controlled by a head drive solenoid 108.

Gear 94 freely rotatable on clutch shaft 44 has a governor spring 102 associated therewith so that when shaft 56 is driven in the opposite direction by a head return spring motor 112 the governor spring 102 controls the velocity of the head return.

The head return spring motor 112 is contained within a housing 114 and one end of the spring is attached to head drive shaft 56 so that when the head drive shaft 56 is driven in the head drive direction the motor 112 will be wound up and the energy stored therein can be released to drive the head in the opposite direction and return it to its original home position.

A head latch arrangement includes a tooth 116 on the head drive shaft 56 and a pawl 118 which is spring biased by spring 120 and operated by a head release solenoid 122 is operable to either latch the head drive shaft 56 and the head 74 in a head latch position at the end of its sweep or release the energy of spring motor 112 for the head return.

The head 74 is secured in a head carrier assembly 75 which, in turn, has a plurality of alignment rollers such as 135 and 137 (plus others not shown in FIGURE 12) for guiding the head carrier 75 in channel shaped tracks 134 and 136 secured to the chassis 27 of the machine. Attached to the head carrier 75 are a pair of multipurpose tapes 76 and 77 of Mylar or similar thin wall flexible material with good tensile properties. The tapes are inclined in opposite directions as shown in FIGURE 12. Wind-up drums or reels 142 and 144 are provided for the tapes 76 and 77, respectively. At the top of the wind-up drums are cord reels 146 and 148, around which a drive cord 150 and a return cord 152 may be wrapped. As shown in FIGURE 12, an idler roll 154 journaled in the frame of the machine is provided for inclining drive tape 76, and a tension pulley 156 biased by springs 160 is provided to keep tension in the flexible drive arrangement of the return cable 152. An axially movable idler pulley 165 is also provided for return cable 152. The drive cord 150 and return cord 152 are adapted to be wrapped around or unwrapped from reels 162 and 164, respectively, on the head drive shaft 56.

*Head and head carrier*

The magnetic head 74 is supported within the head carrier 75 by a unique arrangement which allows for gimbaling of the head as well as detenting of the head from a position where the head would contact the magnetic stripe on the record card to a retracted position where the head is totally out of contact with the record card. More specifically, the entire head assembly is swingable about a pivot point 126 in the carrier 75, see FIGURES 17 and 12. For causing the pivotal movement a cam follower arm 168 with roller 170 is contacted by stationary cam 172 during head drive near the end of head sweep and this retracts the head to its retracted position.

The head assembly 74 is also mounted for rotation about a horizontal axis, extending in the direction of head travel by means of a pivotal connection 127 about horizontal axis 128, see FIGURE 19. Thus, the head can follow irregularities in the recording surface by virtue of its being pivotable about two axes and this effectively provides a gimbal mounting. The pivotal movement about axis 128 is, however, limited in extent by a stop 129.

For detenting the head in retracted position in the head carrier, a detent arm 417 is provided, see FIGURE 17. Arm 417 has roller 421 on its outer end for contacting a stationary cam 420 to release a detent. Arm 417 is pivotally mounted about pivot 419 to an extension 418 of the head assembly 74. By moving the head 74 toward a detented position away from its reading position under the control of arm 168, the pivot 419 will swing toward the right as viewed in FIGURE 17, and will pull the arm 417 toward the right. A spring 423 is connected to the arm 417 and the carrier 75 to bias the arm inward toward the carrier. An extending stationary detent stop 423 is secured to the head carrier and as the arm 417 moves to the right and toward the carrier (under the influence of cam 172 and spring 423) notch 425 in arm 417 will catch on stop 423 and this detent retains the head in its retracted position until released by stationary cam 420.

For tracking the head a pair of ball-bearing rollers 130 and 131, FIGURE 19, are mounted on the bottom of the head carrier to fit within the sides of the groove in channel track 134, FIGURE 17. In addition to roller 135 shown in FIGURE 12, a corresponding mating roller 132 is mounted on the opposite side of the guide channel 136. Also, in addition to roller 137, a further roller (not shown) is provided on the head carrier support 75 for engaging the edges of the channel in track 136 for the guide of the head carrier about three orthogonal axes during its movement.

The head 74 may carry suitable plug type electrical connectors for appropriately energizing the separate heads for each track and electrical connections for the movable head are made through a flexible cable 176 shown in FIGURE 12.

As shown in FIGURE 17, the magnetic head 74 in the carrier 75 is adapted to move from the left (as viewed in FIGURE 17) across a card in the magnetic recording position to the right and then to be detented for its return to the left or home position. As mentioned above, the head carrier 75 when in its home position operates switches 190 and 192. Switch 190 is the head home switch with 2 pairs of transfer contacts, denoted #1 and #2 in the circuit diagram of FIGURE 22, and switch 192 is the on track switch which is opened by the carrier 75 in the home position and normally closed as soon as the carrier 75 is on track that is, up to speed and ready to record.

As the head is driven to the right, near the end of the head track there is a head latch switch 194 which indicates the head 74 has been detented to a retracted position within its carrier 75 by arm 168 contacting cam 172 and camming the head to a detented position. A detent release stationary cam 420 is attached to the side plate 29 to contact wheel 421 on detent arm 417 to release the detent and allow the head 74 to come to rest on a ramp 422 positioned to the left of the left edge guide stop 69 at the left margin of the card and behind the face of the backup recording plate 72, FIGURE 17.

During head travel to the right in FIGURE 17, after the latch switch 194 with its two normally open contacts is closed, the end of head sweep transfer switch 196 is transferred and the contacts #1 and #2 are reversed from that shown. As the head nears the end of its sweep to the right both switches 194 and 196 will be operated and the carrier 75 will be in its rightmost position against stop 174, FIGURE 12. The head 74 will be detented in its latched position with switch 194 transferred, and switch 196 in its normal position. The head is ready for its return to home, driven by the spring motor 112, FIGURE 12. As the head is driven to home the switch 194 returns to the position shown and the switches 190 and 192 are actuated as shown. When the carrier 75 reaches home position the stationary cam 420 operates to release the detent on head 74 allowing the head to come to rest on ramp 422. As the head starts out again it goes down ramp 422 to allow it to contact card 28 on recording plate 72, FIGURE 17, in a gradual acceleration and in a smooth movement to eliminate any bounce as the head first contacts the card.

*Card guide*

In addition to driving and returning the head 74 and carrier 75 the drive and return tapes 76 and 77 act as tension members to drive the head along tracks 134 and 136, and each tape serves as a guide for the card. The drive tape 76 forms a guide for card IN feed as shown in FIGURE 10*a*, while the return tape 77 inclined in an opposite direction serves as a guide for card OUT feed as shown in FIGURE 10*b*. During aligment, drive tape 76 will be inclined at about 10° to the recording platen 72 and the top of guide drive tape 76 will be behind the bottom lip of card feed throat back plate 67, see FIGURE 10*a*. This serves to guide the card 28 from the throat 26 down onto the gate 78. When the gate 78 is opened under the control of the gate cam it forms a lower extension of recording platen 72. This will be the condition during OUT feed of the card from the printing position.

During OUT feed return tape 77 is inclined in the opposite direction and laps in front of throat back plate 67 and behind the ledger guide plate 86, thus forming a path to guide the card back up into the throat 26, see FIGURE 10*b*.

The operations are timed with the rest of the machine so that the drive tape 76 is in position for guiding a card 28 during alignment and return tape 77 is in position for guiding a card during OUT feed in the timed cycle of operations. Thus, not only do the tapes serve as tension and pulling members for the head 74 and head carrier 75 but they also serve as card guides.

The machine is constructed to operate by performing automatic magnetic read-write operations and posting operations on a ledger card 8½ inches in width. However, the mechanical construction of the machine allows for a ledger card 14 inches in width. The extra width of a card in the machine would be unguided by the drive tape arrangement above. Therefore, beginning at the point the return drive tape leaves off (in the latched position), a wide card skirt 110 of suitable flexible material is positioned in the area of the guide tapes below the throat to guide wide cards during their movement in and out of the machine. Wide card skirt 110 is shown in FIGURE 17.

*Line sense assembly*

The line sense assembly is best seen in FIGURES 20*a* and 20*b* taken in connection with FIGURE 6. The line sense assembly includes a line sense disable magnet 434 operating an armature 435, see FIGURE 6, to disable the line sense switch 184. The line sense assembly also includes a bracket 436, FIGURES 20*a* and 20*b*, which pivotally mounts the line sense switch operating arm 185 which in turn carries starwheel 432 on the lower end thereof. Also attached to the operator arm is one of the contacts of the normally closed line sense switch 184. The armature 435 of the line sense disable magnet 434 contacts a knob 437 (FIGURE 20*a*) on operator arm 185 and when the magnet is actuated the line sense arm is pivoted to remove the line sense starwheel 432 from card contacting position and open the line sense switch 184, which is normally closed. Also, the presence of a card 28 and the absence of a hole 36, FIGURE 2, passing under the starwheel 432 will open normally closed line sense switch 184. Card sense switch 182 is also normally closed by contacts (not shown) attached to the end of card sense operator arm 183 which is also pivotally mounted and biased in line sense bracket 436. The presence of a card under a wheel 438 on the end of card sense operator arm 183 will open the normally closed card sense switch 182. The bracket 436 is secured to the chassis 27, FIGURE 5, such that the line sense starwheel 432 is aligned above the punch and in line with the holes 36 in an aligned magnetic ledger card 28, FIGURE 2.

*Punch assembly*

The punch assembly for punching a posting hole in the card can best be seen with reference to FIGURES 7 and 15 taken together. Referring to FIGURE 7, first a punch magnet 300 includes a pivoted armature 302 biased by spring 304 with a clevis 306 on the end of the armature connecting to a pivoted clutch stop 308. A punch clutch of the dog type indicated generally at 310 is mounted for free rotation on the outer end of cam shaft 55, FIGURES 5 and 13, and is driven by a punch clutch drive gear 312 through an idler 314 from a gear 316 mounted on the end of continuously rotating alignment shaft 236. A spring 309 for biasing the clutch stop 308 is attached to the clutch stop and to a check pawl extension 311. A pivoted check pawl 322 cooperates with clutch check plate 318 to check reverse movement. A rotating punch cam 320 is driven when the clutch is actuated to operate pivoted punch cam follower 324. Punch cam follower 324 includes a switch actuator ear 326 for actuating the punch switch assembly 199 which has normally open contacts 198 and normally closed contacts 200. A punch operating linkage indicated generally at 328 in FIGURE 7 connects to a punch element. The remainder of the linkage can be seen in FIGURE 15 where the pivoted cam follower 324 is connected through an adjustable yoke 330 to one end of a pivoted punch operating lever 332 which has a guided punch 334 attached to the other end thereof. The punch 334 is adapted to punch posting line holes 36 in the magnetic ledger card 28 as shown in FIGURE 15, one hole at a time after a particular line is printed so that the next time the card is fed into the machine, the machine will sense the hole and will print on the next line. A die block 336 is positioned on the opposite side of the record from the punch 334.

*Chad removal assembly*

As also shown in FIGURE 15, there is a chad removal assembly for removing the punched material (chad) from the interior of the machine. The die block 336 is in communication with a chad removal chute 338 having an opening 340 outside the machine frame side 29 and above a suitable removable receptacle (not shown). Chad 342 may be removed from the die block 336 by a screw conveyor 344 driven by a gear 345 from a gear 343 on the lower feed roll shaft through a belt 341, see FIGURE 7.

*Index clutch assembly*

The index clutch assembly is shown in FIGURE 16. The clutch shaft 44 which is continuously rotating carries gear 61 in mesh with idler 346 which, in turn, is in mesh with an index clutch drive gear 347. The entire index clutch 77 is loosely rotatable on cam shaft 55, but an index cam 362 thereof can be rotated by actuating the clutch and this rotation is from index clutch drive gear 347. The index clutch 77 is a dog type clutch which includes a release ring 348 adapted to be selectively contacted by a clutch stop 350 under the control of a magnet 356 having a pivoted armature 358 and a connecting link 360. A spring 352 connected to double-armed check pawl and index switch operator 205 serves to bias the check pawl and the clutch stop 350. The index clutch cam 362 is contacted by cam follower 364 biased by spring 365 and pivotal about stub shaft 373. When the clutch is connected to the drive, the cam 362 will rotate, pivoting the cam follower 364. An intermediate link 368 is freely rotatable about stub shaft 373 and is contacted by pin 366 on follower 364 to drive it counterclockwise as viewed in FIGURE 16. Link 368 also has a pin 370 on its outer end which, similarly, would move counterclockwise and contact an outer end of bell crank link 372 pivoted about shaft 80. Bell crank link 372 includes a foot 371 attached to the ledger card gate 78. It can be seen that rotation of the index clutch 77 and cam 362 under control of index magnet 356 pivots the cam follower 364 counterclockwise and rotates the gate 78 clockwise through the intermediate linkage to open the gate.

The index clutch cam 362 is adapted to override the action of the gate cam 210 also mounted on cam shaft 55. As explained before, gate cam 210 is contacted by pivoted follower 211 which is loosely mounted for pivoting on stub shaft 373. Follower 211 and link 368 are rigidly interconnected by tubular bushing 374 so that when follower 211 pivots on shaft 373 link 368 will likewise pivot, accomplishing the same motion as indicated by the arrows in FIGURE 16 and opening or closing the gate as will be desired in the cycle and sequence of events.

*Full card mechanism*

When a ledger card is completely full and there is no additional space thereon for further information, this is sensed by a full card switch and the card is then fed back out of the machine. As will be explained later, a duplicate cycle may also be initiated so that another card may be inserted into the machine and the heading and the last entry thereon placed on this new card. A full card mechanism is indicated generally by reference numeral 400 in FIGURE 18 and is driven from the continuously driven clutch shaft 44 by the card feed pinion 270 meshing with a full card gear 402. The full card clutch includes the drive gear 402, a friction drive disk 404 and a stub shaft 406 mounted in a bracket (not shown). A clutch ring 408 is adapted to be contacted by a clutch stop 410 under the control of cam line position 55 and stud 412 mounted on shift cam 214. An actuator 414 carries switch contacts of full card switch 416. The operation of the full card unit will be described in connection with the whole system at a later date and, as can be seen, it is an adjunct to the main portion of the machine. It can be removed by removing the bracket supporting shaft 406 and the supports for the remainder of the elements (except clutch shaft 44 and cam shaft 55) and shown in FIGURE 18.

*Electrical system and timing*

The timing diagram for the cams and the machine is shown in FIGURE 21 and will be described in detail with respect to the operation of the machine.

Figure 22A:
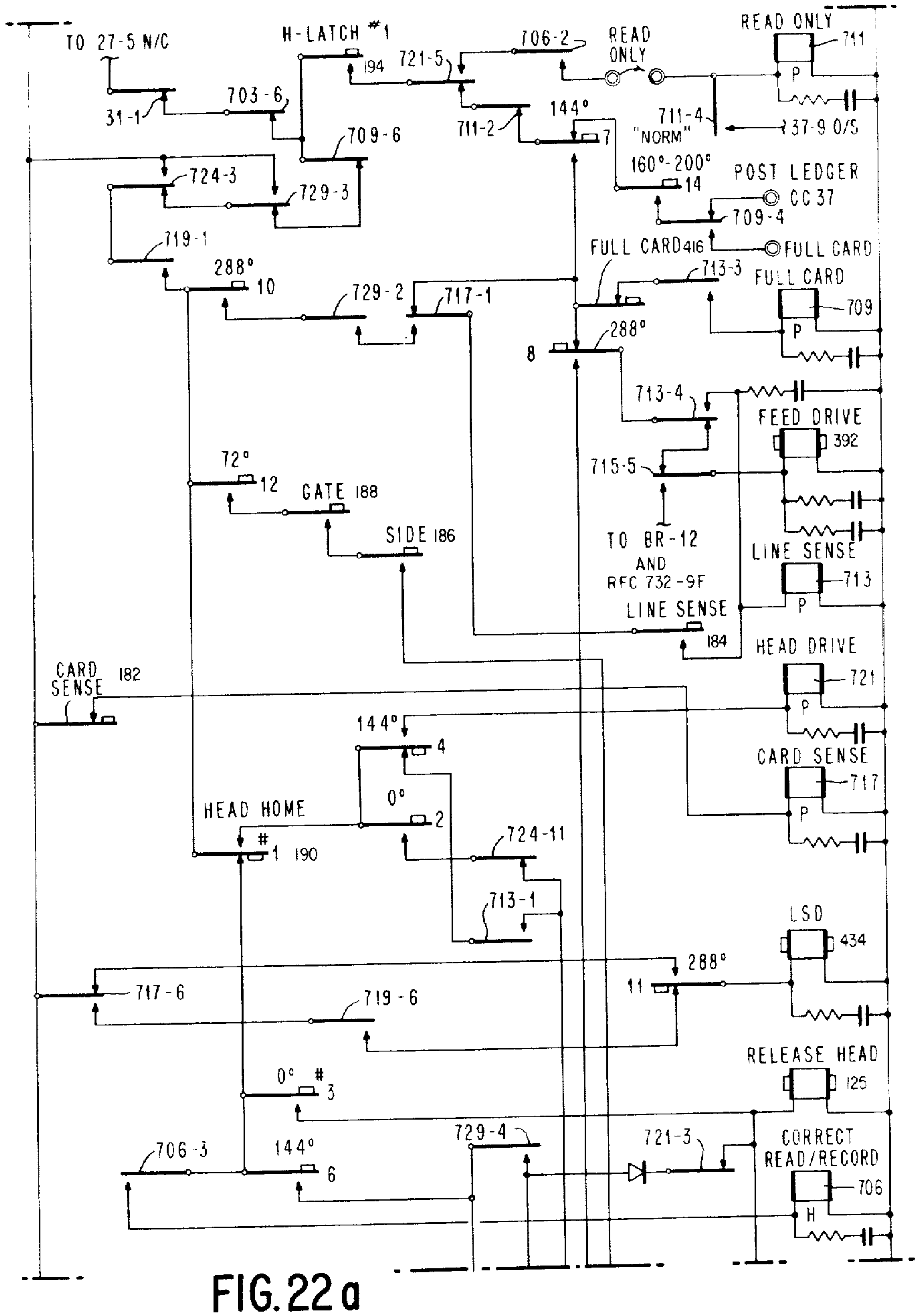
Figure 22B:
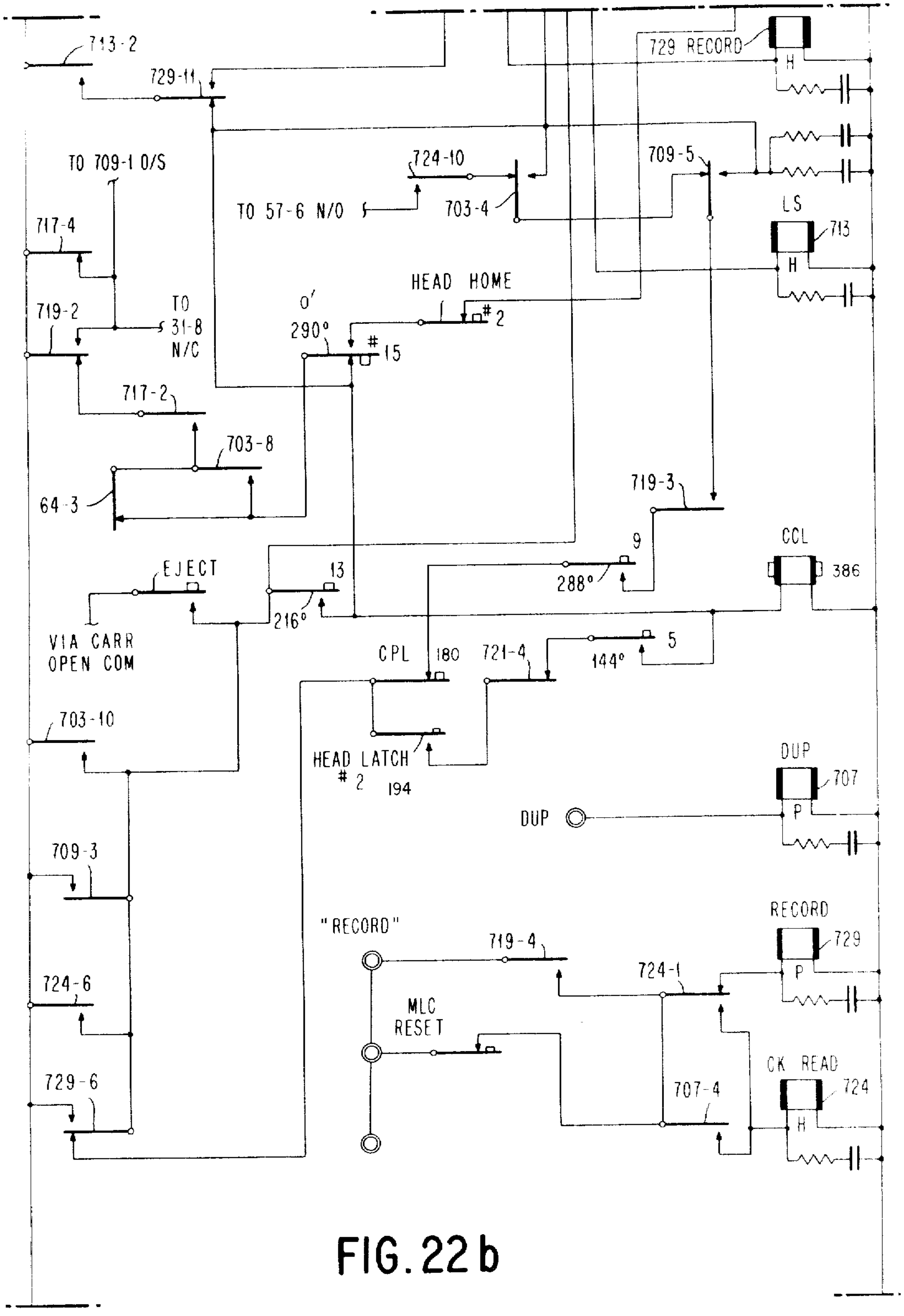
Figure 22C:
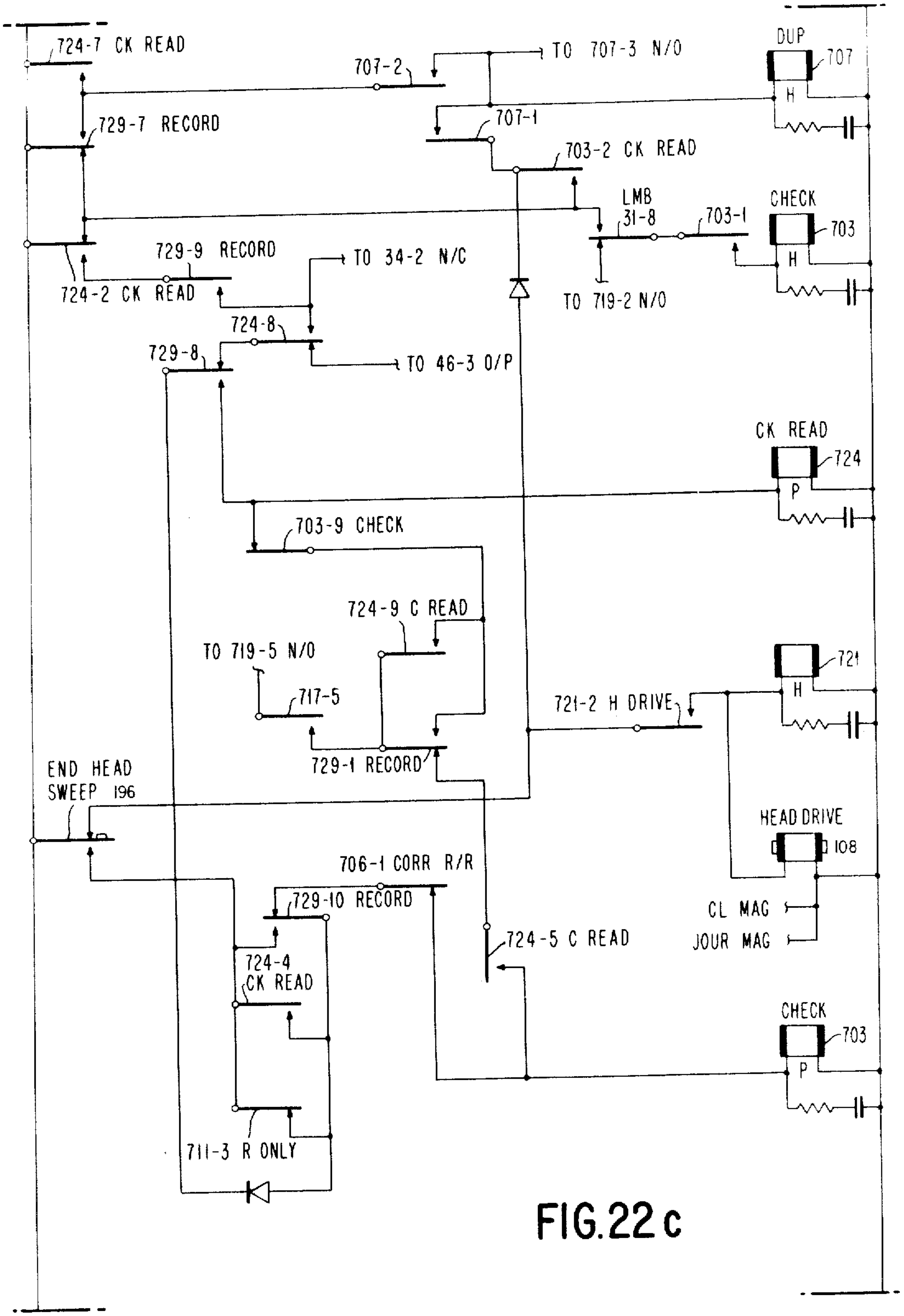
Figure 22D:
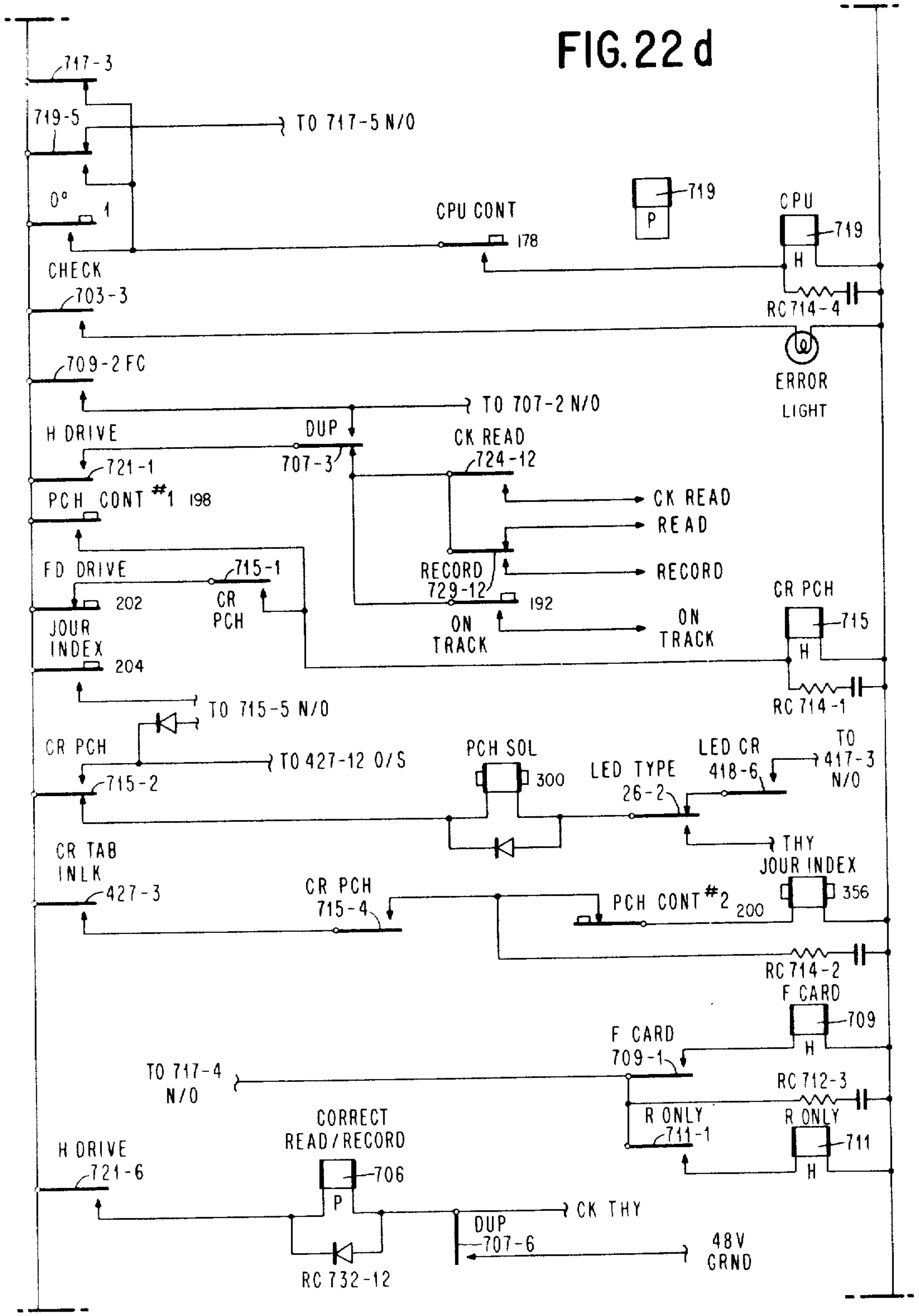

The electrical arrangement of the switches discussed above in the particular electrical circuit is shown in the logic circuit diagram, FIGURES 22*a*, 22*b*, 22*c* and 22*d*, which are arranged one on top of another with FIGURE 22*a* on top and FIGURE 22*d* on the bottom. In the circuit diagram the relays are shown in conventional sense with the voltage applied to the line at left and the line at the right connected to ground. The logical circuit diagram including the switches and relays is part of the overall accounting system shown in the companion copending applications referenced above. However, since only a portion of the overall system is necessary to the understanding of this invention only that portion necessary will be described.

In addition to the magnets mentioned above, the logic circuit includes a number of relays which are as follows: a line sense relay 713, a head drive relay 721, a card sense relay 717, a full card relay 709, a correct read write relay 706, a read only relay 711, a record relay 729, a duplicate relay 707, a check read relay 724, a check relay 703, a card present upper relay 719 and a card punch relay 715. Also, all of the switches and their contacts are shown in the circuit diagram.

It should be noted that the circuit diagram shows the components in their normal state, not necessarily the condition of the machine at rest. For example, the on track switch 192 is normally closed but with the machine at rest and the head in home position, it will be held open.

*Operation*

The operation of the machine will not be described.

The following chart shows the various functions at the different cam line positions:

CAM LINE POSITION

| Cam/Angle | 0° | 72° | 144° | 216° | 288° |
|---|---|---|---|---|---|
| 1. Pressure Cam Feed Rolls 68 | Out | Out | In | In | In |
| 2. Alignment Cam Alignment Wheel 65 | Out | In | Out | Out | Out |
| 3. Gate Cam Gate 78 | Closed | Closed | Open | Closed | Open |
| 4. Shift Cam Reverse Gears | OUT Feed | IN Feed | IN Feed | OUT Feed | OUT Feed |

The normal sequence is as follows:

With the machine on and no magnetic ledger card 28 in the unit, the machine will be in the 0° cam line position and the read-write head 74 will be at home position (left). All solenoids are de-energized.

The operator will insert a magnetic ledger card 28 into the throat 26 of the machine 24 such that the magnetic stripe 34 is at the bottom and away from the operator. After the operator has inserted the card a predetermined distance into the throat 26, the card present upper switch 178 (CPU) will be transferred by the card 28 and thus start the sequence of timed operations.

Referring to FIGURE 22*d*, when the operators drop the card in the machine is in cam line position 0°. Cam switch #1 is closed at 0°. The card closes card present upper contacts—CPU (178), which in turn picks card present relay 719. This will close 719–1 (FIGURE 22*a*) and apply voltage to clutch cam line magnet CCL (386), FIGURE 22*a* through Head Home #1 (190) normally open but closed by head in home position at 0°, 0°–2 normally open but closed at 0° and 724–11 normally closed, to CCL magnet (386). CPU switch 178 will thus cause operation of the cam line clutch 46 and cause rotation of the cam line 55 to the 72° position where the alignment wheel 65 is forced under spring tension against the card 28 and due to its rotation and angular position, will drive the magnetic ledger card down and to the left against the aligning edge 69 and card gate 78 which are at right angles to each other. There the two switches termed "side" and "gate," 186 and 188 respectively, are transferred by the card edges when it is .008–.012 inch from each of the reference surfaces of edge 68 and gate 78.

Once the gate 188 and the side switch 186 contacts are closed, and 72° cam switch 12, FIGURE 22*a*, is closed a circuit is made to pick lines sense (LS) relay 713. This relay (713–LS) will again pick the CCL magnet through contacts 713–2. The cam line clutch 46 is again energized and the cam line rotates to the 144° position. As it rotates, the pressure cams 208, 224 will first apply pressure to the upper feed rolls 68 so as to clamp the card in its proper position before the alignment cam 218 forces the alignment wheel 65 back from its alignment position and then the gate 78 is opened so that it will not inhibit card feed; see the timing diagram, FIGURE 21.

The card 28 is now clamped and in magnetic transducing position such that the magnetically recorded stripe 34 on the card and the read-write head 74 are aligned for a head sweep.

At the 144° position head drive relay 721 (FIGURE 22*a*) will be picked through head home #1 (190) normally open but transferred with the head in home position and, 144° #4 normally open, but transferred at 144°. This will apply voltage to 721 hold coil (FIGURE 22*c*) through end head sweep switch 196 normally closed, 721–2 normally open and also to head drive solenoid 108 by the same route.

With the transducer head drive solenoid 108 energized, rotation of the head drive clutch 58 starts rotation of the head drive shaft 56. Rotation of cord drum 162, 164 on shaft 56 will cause cord 150 to wrap up on drum 162 and thus draw the head carrier 75 from left to right at a predetermined constant speed, see FIGURE 12. During its rotation, the head drive shaft 56 is winding up spring motor 112 which is attached to its outboard end so as to provide the motivating force for the return travel of the head 74 and head carrier 75.

The head 74 is mounted in its carrier 75 on a gimble mounting and spring urged against recording plate 72, see FIGURE 19. The magnetic ledger card 28 when clamped in transducing position is disposed between the head 74 and the plate 72. After an acceleration period the circuits in the calculator are conditioned by on track switch 192 mounted adjacent to the head carrier 75, FIGURE 17. The information then sensed (FIGURE 3*a*) by the head 74 trigger appropriate circuitry and the coded information recorded on the card is transferred to the memory of the calculator for processing. The gimble mounting FIGURE 19 not only provides a pivot point for the read-write head parallel to the card 28 and the read-write head air gap but the effect of any irregularities caused by manufacturing tolerances in the metal plate, or set in the card is greatly reduced by a second degree of freedom 90° to the first pivot and read-write air gap.

All coded information is stored on the card 28 in the magnetic track 34 of predetermined length, usually the width of a ledger card. The head 74 is cammed out of contact by cam 172 after the head has scanned the entire length of the track 34, see FIGURE 12. The head 74 is then latched out of contact by the latch (FIGURE 19) also mounted on the head carrier 75.

At the start of a head sweep, on track switch 192 is closed when the head 74 is up to speed on the track. With the head drive operating, a circuit is completed through a normally closed point 707–3 to the on track switch 192, FIGURE 22 and once it closes indicating that the head 74 is up to speed, and a pulse will be sent to the calculator and it will turn on read amplifiers (not shown) so they will pick up whatever coded information is on the magnetic stripe 34 of the card. The head 74 will be moving relative to and in contact with the magnetic ledger card 28. It will read the information and it will continue to drive from left to right until the end head sweep switch 196 shown in FIGURE 22*c* is transferred, thus removing the voltage from the hold coil head drive relay 721 and the head drive solenoid 108. When end of head sweep switch 196 disables the head drive solenoid 108 and the spring motor 112 attempts to return the head carrier 75 to its home position. However, the head latch pawl 118 prevents this by intercepting stop cam 116 mounted on the cord drum shaft 56. Stop cam 116 is adjusted such that the head latch switch 194 is still transferred by the head carrier.

As shown in FIGURE 12 the carrier 75 is drawn along the guide rails 134, 136 by drive tape 76 which winds up on spool 142 which in turn receives its motivating force from head drive shaft 56, and drive cord 150 which winds and unwinds on cord drum 162. On the return sweep, return tape 77 is attached to the head carrier 75 and return cord 152 is connected to drum 164 on shaft 56 in a similar manner. As the head carrier 75 moves along its path, there is some difference in cord loop length due to the winding and unwinding of the tapes 76, 77 on their respective spools 142, 144. Tension pulley 152 is provided to keep cord tension constant and adjust for the shock due to acceleration. A second stabilizing device, the shock unloader clutch 63 controls acceleration and serves as a safety device in the event of overload.

The tapes 76, 77 serve as both head tension actuating members and as card feed guides. The drive tape 76 is angled so as to help align the magnetic ledger card when the carrier is in the home position. It is positioned at an angle of 10° to the read-write platen surface 76 with the widest opening at the top and overlapping the top read table (not shown) so that the paper must follow the desired path, see FIGURE 10*a*.

The bottom edge of the tape 76 overlaps the ledger guide 86 which serves as a guide and a stop for the card gate 78. Thus, the magnetic ledger card 28 is contained on all sides during alignment.

The return tape 77 is also angled to the read-write platen surface 72 but with its widest opening at the bottom, so that when the magnetic ledger card is being fed out it will be guided into the correct area, see FIGURE 106. This is one reason that the head 74 is latched at the right most position after a read cycle.

Following the read sweep, with the carrier 75 in the latched position, head drive solenoid 108 is deenergized by transferring of end head sweep contacts 196 (FIGURE 22c) with the cam line in the 144° position.

To then feed the card 28 in to the print station, feed drive magnet 392 (FIGURE 22*a*) is operated through 31–1 normally closed, 703–6 normally closed, head latch #1, 194 normally open but transferred when head 74 is latched at the end of a scan, 721–5 normally closed, 711–2 normally closed, 144°–#7 normally open but closed at 144°, 288°–#18 normally closed, 713–4 normally closed and 715–5 normally closed. This energizes the feed drive magnet 392 to operate feed drive clutch 49 and because shift cam 214 has the power train shifted for IN drive the card will be driven IN to the posting or printing area.

Located at the lower left hand corner or the record plate 72 are the punch, and line-sense assemblies 64 and 430, see FIGURES 15 and 20 respectively.

The punch 334 is positioned so that it will punch one rectangular hole 36 in the card (with its long axis horizontal) a predetermined distance from the left edge of the card and a predetermined distance down from the gate. It receives its power to punch from the punch clutch 310 (FIGURE 7) which is under control of punch solenoid 300. The chad punched from the card is carried out to the side of the machine by screw conveyor 344 (FIGURE 15) for collection.

The line sense assembly 430 is disposed above the punch and contains two switches, the line sense switch 184 and the card sense switch 182. The card sense switch 182 senses when a card is in the posting area. The line sense switch 184 senses a hole or the top edge of the card on the IN feed and senses the bottom of the card on the OUT feed. The line sense arm 185 which actuates the switch 184 is positioned so that the starwheel 432 which pivots at its outer end will sense two line spaces above and in line with the card punch.

During feed, the line sense switch 184 is abled, by de-energized line sense disable (LSD) magnet 434, so that when a hole 36 (or the top of a new card) is sensed by the starwheel 432 the line sense switch 184 causes power to be removed from the card feed clutch 49. Line sense relay 713 (FIGURE 22*a*) is picked through 717–1 normally closed and line sense contacts 184 held open by card but closed on sensing a card line sense hole 36 in the posting area. The operation of relay 713 interrupts feed drive by opening 713–4 normally closed, and the cam line magnet CCL (FIGURE 22*b*) is operated via 713–2 normally open now closed, and 729–11 normally closed. Thus the cam line is rotated from the 144° position.

The card feed stop pawl 394 (FIGURE 11) then catches the next tooth on the stop ring 390 of the card feed clutch 49 and the clutch detents in a typical manner (the necessary overthrow being provided by inertia). It then follows that the hole 36 sensed will stop one line below the sensing position and one line above the punch position, due to the physical relation of the components. As noted above, as soon as line sense relay 713 is energized by the line sense switch 184; the feed clutch 49 stops, and the cam line clutch 46 is operated to rotate the cam line 55 to the 216° position. The card gate 78 closes to press the magnetic ledger card 28 against the printing platen 84, see FIGURE 9. During its rotation 216°; the cam line switch "Norm" #14 is transferred, and a controlled electric pulse "Post Ledger" (FIGURE 22*a*) is transmitted to the calculator to inform it that the posting line has been reached by the magnetic ledger card 28 and printing may start, under control of the calculator by the print head 82. This "Post Ledger" pulse is fed via 144°–7 normally closed, 160°–200 0–#14 "Norm" normally open but then closed and 709–4 normally closed.

The posting by the typewriter unit 17 proceeds automatically under control of the calculator 11, 12 for one posting line. At the end of each posting line, a typewriter carrier return (CR) is initiated. Each new posting line must have a hole 36 punched therein for sensing, and the magnetic ledger card 28 must be indexed up one line space to condition the magnetic ledger card 28 properly for multipleline posting if it is desired.

When a carrier return (CR) signal is received by the magnetic ledger card unit, power is applied to the punch clutch 310, FIGURE 7, and the card punch 334 creates a new line sense hole 36. Therefore, at the end of each posting line carrier return (CR) is initiated. Punch solenoid 300 is operated (FIGURE 22*d*) via 715–2 normally closed, 26–2 normally closed and 418–6 normally open but then closed. During its rotation, the punch clutch 310 transfers punch contacts #1 which energizes a card punch relay 715. More particularly, in FIGURE 22*d*, relay 715 is picked via punch contact #1 198 normally open but closed during punch operation, and index magnet is picked via 427–3 normally open, 715–4 normally open and punch contact #2 200 normally closed by virtue of the punch 334 withdrawing from the card.

The operation of the index magnet 356 (FIGURE 22*d*) causes the index clutch 77 to rotate and index switch 204 normally open (FIGURE 22*d*) to transfer, sending a pulse to feed drive magnet via 715–5 normally open (FIGURE 22*a*). Index clutch follower 364 (FIGURE 16) cams the card gate 78 open so as not to inhibit feed movement of the magnetic ledger card 28. Then, after the gate 78 is open, the index contact 204 (FIGURE 11) operated by the index clutch applies power to the card feed clutch magnet 392 which drives the power train in the OUT feed mode due to reverse shifting by shift cam 214.

The card feed clutch magnet 392 when operated, transfers contact 202 which deenergizes the punch relay, and thus removes power from itself and all other magnets in this mode until another carrier return (CR) signal is received. That is, as soon as the armature of the feed drive magnet 392 has approached a sealing condition with its magnet core, the armature opens the feed drive contact 202 (FIGURE 22*d*) and releases 715 relay via 715–1 normally open. This also releases the feed drive magnet 392 (through 715–5) and the clutch 49 detents after moving the magnetic ledger card 28 up one space. It may be seen that the card feed will only escape one tooth of clutch stop ring 390 during this operation so that only one line index is accomplished by the magnetic ledger card. After the magnetic ledger card has completed its motion, the index clutch 77 will continue its rotation, closing the gate 78 and return to its latched condition.

The disable magnet (LSD) 434 is so disposed as to remove the line sense arm 185 from the magnetic ledger card 28 when desired. These times are during alignment of magnetic ledger card, magnetic reading or recording of the magnetic ledger card and during initial feeding of the magnetic ledger card either in or out.

It can be seen from FIGURES 22*a–d* that the disable magnet (LSD) 434 is energized as soon as a magnetic ledger card is inserted into the machine by transferring card present upper 178 and remains disabled during alignment and reading and until the magnetic ledger card has transferred the card sense switch 182 on its way to the posting line. The LSD magnet is operated through 717–6 normally open but transferred when CPU is operated, 719–6 normally open but transferred when card sense 182 is operated and 288–11 normally closed (FIGURE 22*a*). Once the card has fed into the posting area (printing position), card sense switch 182 (FIGURE 22*a*) is transferred and card sense relay 717 drops out. This deenergizes the LSD magnet. On OUT feed the line sense arm 185 is again disabled until the card transfers card sense 182.

It may be seen from the foregoing that the reason for disabling the line sense arm 185 at the aforementioned times was to remove the presence of the line sense arm 185 and its accompanying pressure during these times which could inhibit alignment and cause card skew during the initial periods of card feed. It can also be seen that the presence of the line sense arm 185 during any magnetic head sweep would push the magnetic ledger card 28 away from the reading table 72 and cause a loss of signal at the first part of the magnetic head sweep.

After posting of the updated information on the magnetic ledger card has been completed by the typewriter 17, the calculator 11 will cause a new line sense hole 36 to be punched and the print carrier 82 of the typewriter 17 to be returned to the left-most position. After the punch and index cycle has been completed as set out above a control signal from the calculator, namely "record" FIGURE 22*b* will cause the cam line 55 to rotate from the 216° position to 288°. Specifically, the control signal from the calculator will place voltage at the record hub. This will cause record relay 729 to be picked through magnetic ledger card reset normally closed and 724–1 normally closed. Also, the CCL magnet 386 will be picked via 729–6 normally open but closed and 216°–#13 normally open but closed at 216°. Thus, the cam line 55 rotates from the 216° position to the 288° position. It can be seen from the timing chart FIGURE 21 that the only cam causing motion during this period of the cycle is the gate cam 210 which forces the follower 211 to open the card gate 78 so as not to inhibit magnetic ledger card feed.

As soon as the cam line 55 reaches 288° and record is present, the card feed clutch 46 will engage and the magnetic ledger card 28 will be driven out from the posting line toward the read-write station. Particularly, when the cam line reaches 288° feed drive magnet 392 (FIGURE 22*a*) will be operated via 729–6 normally open but now closed, 288°–8 normally open but now closed, 713–4 normally closed and 715–5 normally closed. This will cause the card to feed OUT of the posting area, since the power train is in the OUT feed mode due to the cycling of shift cam 214.

Line sense arm 185 will be abled by deenergizing LSD magnet 434 by the card moving out of the posting area and card sense switch 182 returning to its normal closed state picking card sense 717 relay. OUT drive will continue until such time as the line sense arm 185 senses the bottom of the magnetic ledger card 28. It can be seen from FIGURES 22*a–d* that the line sense switch 184 is abled electrically after the magnetic ledger card 28 has passed the card sense switch arm 185 position on its way OUT. When the line sense switch 184 transfers at this time, feed drive magnet 392 is interrupted by energizing the line sense relay 713. Specifically, relay 713 (FIGURE 22*a*) will be operated when the bottom of the card passes from under the normally open but then closed line sense contact 184 via 724–3 normally closed, 719–1 normally open but transferred, 288–#10 normally open but closed at 288°, 729–2 normally open but transferred, 717–1 normally open but transferred and line sense contact 184. This will cause the feed drive magnet 392 to be deenergized via 713–4 normally closed transferring with the energizing of relay 713, thus stopping the card OUT drive.

The magnetic ledger card machine is inhibited from further operations as long as the read-write carrier 75 is not in its home position. At this time this condition is sampled and since the read-write head is in the latched position, the head latch magnet 125 is energized. To release the head for its return to home with sense relay 713 picked, the release head magnet 125 (FIGURE 22*a*) operates via 713–2 normally open but closed, 729–11 normally open but then closed, 729–4 normally open but closed and 721–3 normally closed. The head carrier 75 is then driven left by the spring motor 112 until it reaches its leftmost or home position. When the head carrier 75 reaches the home position the detent which has held the head 74 away from the plate 72 is released by cam 420 mounted at the home position and the head 74 is again spring-urged against table 72, see FIGURE 17.

The CCL magnet 386 will operate when the head 74 gets home and transfers head home normally open #1 switch 190, 144°–#4 normally closed and 713–1 normally open. This will cycle cam shaft 55 to 0°. Since the magnetic ledger card 28 is still in a position to keep card present upper switch 78 transferred, the cam line will rotate to the 72° position and the alignment wheel 65 will again force the magnetic ledger card 28 down and to the left against the two reference surfaces, gate 78 and edge 69. This procedure is exactly the same as described above on the first cycle with the exception that "record" is present. Alignment and the next head sweep are also the same as described above, except that record is present.

After the card 28 has been aligned and clamped, the head drive relay 721 is energized and at the same time the head drive magnet 108 is energized which causes the carrier 75 to move from left to right as in the read cycle, but this will be a record cycle.

With record present, the record relay 729H (FIGURE 22*b*) will be held through a normally closed head home point #1 (190) which has been made by the moving of the carrier 75 away from the home position through 144°–#6 normally open but closed at 144° and 729–4 normally open but closed during record.

Travel of the head 74 and its carrier 75 is the same as in a read cycle, but the magnetic head 74 is being controlled by the calculator so as to magnetize the magnetic stripe on the magnetic ledger card in a coded fashion with selected data, for example the information which was printed by the typewriter during the posting operation. The information encoded can be all or part of the printed information. It depends on the accounting operation the system is used for and the way the programmer wants to handle it.

At the end of the record head sweep, the head drive relay 721 and magnet 108 are deenergized by the transferring of the end of head sweep (EHS) switch 196. The transferring of EHS also causes the energizing of the read check relay 724. That is, at completion of first sweep after new information has been recorded 724 relay (FIGURE 22*c*) will be picked via end head sweep 196 normally open but closed, 729–10 normally open but closed and 729–8 normally open but closed and 724 relay will be held through record hub (FIGURE 22*b*) 719–4 normally open but closed and 724–1 normally open but closed. As mentioned earlier, the record relay is being held through the normally closed head home #1 contact. That is, record relay 729H (FIGURE 22*b*) is held via 724–3 normally open, 719–1 normally open but closed, head home #1 normally closed, 144°–#6 normally open but closed and 729–4 normally open but closed. Therefore, at this point, both read and record relays are energized and the cam line is at 144°. The head latch or release magnet 125 is energized through a record relay point 729–4 and 144°–#6 closed, head home #1 etc., so that the read-write head carrier will not be latched in its rightmost position but will be returned home, receiving its motivating force from the spring motor 112.

When the head carrier 75 arrives at home position head home #1 is transferred and record relay 729H deenergizes (FIGURE 22*b*). Head drive relay 721 (FIGURE 22*a*) is operated as on previous head sweeps as is head drive magnet 108.

After the head carrier 75 transfers the head home switch 190 the head drive relay 721 and magnet 108 are again energized as noted above and the carrier 75 again moves from left to right. The record relay 729 which was held by a normally closed head home contact #1 (190) is now deenergized by transferring of switch 190 but voltage is still present from the record hub via read check relay point 724–1 which is still energized.

This sweep of head 74 is made for checking purposes.

The information recorded on the magnetic ledger card 28 is compared bit for bit with the information still retained in the memory of the calculator 11. If there are any differences an error light FIGURE 22*d* is turned on and the record sequence is initiated again.

After the check sweep, the head drive relay 721 and magnet 108 are deenergized as before and the cam line magnet (CCL) 386 is energized as soon as the head carrier 75 is in the latched position. However, in this one instance, the cam line will not stop at the 216° position but continue to the 288° position. The reason for this is that the read check relay 724 is still energized and this will supply voltage (from the record hub) to the cam line magnet CCL (386) at the 216° cam line position. Specifically, head drive 721 relay and head drive magnet 108 are deenergized at end head sweep as described above. Cam line rotates to 288° by the operation of CCL magnet 386 (FIGURE 22*b*) via 724–6 normally open but closed, 729–6 normally closed, head latch #2 normally open but closed with the head latched, 721–4 normally closed and 144°–#5 normally open but closed at the 144° position.

When the cam line reaches the 288° position, the card feed drive magnet 392 will be energized and the magnetic ledger card 28 will be fed OUT from the magnetic transducing station. In the circuit diagram, feed drive magnet 392 (FIGURE 22*a*) operates via 724–6 normally open but closed as noted above, 288°–#8 normally open but closed at the 288° position, 713–4 normally closed and 715–5 normally closed.

The magnetic ledger card 28 will continue to feed OUT until the card present lower switch 180 (FIGURE 22*b* and FIGURE 9) is transferred. This sends a signal to the calculator which energizes a start relay in the calculator (not shown) which, in turn, removes voltage from the record hub, thereby, removing voltage from the card feed magnet 392, by opening the points 724–6 of check read relay. Also read check relay 724 is deenergized by removing voltage from record hub to allow the hold coil 724H to drop (FIGURE 22*b*). The magnetic ledger card 28 is then retained in the throat 26 of the machine 24 and rests between the upper feed and pressure rolls 68, 70 but is not tightly held or driven by them. The cam line 55 remains at the 288° position. In other words a start relay (not shown) in calculator 11 is picked when the magnetic ledger card 28 feeds out past the operating arm of card present lower switch 180 (FIGURE 22*b*) via 724–6 normally open but transferred, 729–6 normally closed, card present lower 180 normally closed and closed when card feeds out from under contact arm, 288°–#9 normally open but closed at the 288° position, 719–3 normally open but closed, 709–5 normally closed, 703–4 normally closed, 724–10 normally open but closed to 57–6 normally open. This removes the voltage from the record hub (FIGURE 22*b*), the 724 relay drops out, feed drive drops out by opening points 724–6 and the machine waits for the operator to remove the posted, recorded, and checked magnetic ledger card 28.

The operator can remove the updated ledger card 28 from the magnetic ledger card machine 24 and in so doing transfers the card present upper 178 switch (FIGURE 22*d*) to its normally open state. When this happens, the cam line magnet (CCL) 386 is energized and the cam line 55 rotates to the 0° position for the second time, and the read-write carrier 75 returns to the leftmost position as previously described. This brings the magnetic ledger card machine 24 back to its normal rest position and in a condition to accept another magnetic ledger card 28. In the circuit diagram, on removal of the card 28, card present upper switch 178 returns to its normally open state (FIGURE 22*d*) dropping relay 719 and cam line magnet CCL 386 (FIGURE 22*b*) operates via 719–2 normally closed, 717–2, normally open but closed, 64–3 normally closed and 0′–#15 normally closed. This causes rotating of the cam line 55 to 0°. The head release magnet (FIGURE 22*a*) is operated via 719–2 normally closed, 717–2 normally open but closed, 64–3 normally closed, 9′–#15 normally open but then transferred and head home #2 (191) normally closed.

This completes the normal magnetic ledger card unit cycle.

The other possibilities are:

(1) Read error
(2) Record error
(3) Duplicate (full card)
(4) Eject.

In all of these, the sequence is standard to a point and then the calculator overrides the normal sequence and operation to force the appropriate action.

The first of the exceptions to normal routine mentioned was "read error." The first part of the cycle is normal up to the transferring of the end head sweep switch (196) by the read-write head carrier 75 at the 144° position. Normally the magnetic ledger card 28 would now be driven to the posting line. However, when an error is detected, an error or check relay 703 is energized and voltage is applied to the cam line magnet CCL 386 causing it to rotate through the 216° position to the 288° position and then the card feed magnet 392 is energized and the magnetic ledger card 28 will be fed OUT due to the shifted power train to the eject position. The insertion of the magnetic ledger card 28 will cause the sequence to be initiated again. In the circuit diagram 703 relay (FIGURE 22*c*) is picked via end head sweep 196 normally open but transferred, 711–3 normally closed, 729–10 normally closed and 706–1 normally closed. Cam line magnet CCL 386 (FIGURE 22*b*) is picked via 703–10 normally open but closed, 729–6 normally closed, head latch #2 (194) normally open but transferred, 721–4 normally closed and 144°–#5 normally open but closed at 144° to rotate to 216°. At 216° the CCL magnet 386 is again picked via 703–10 normally opened but closed and 216°–#13 normally open but closed at the 216° position. Feed drive magnet 392 operates via 703–10 normally open but closed, 288°–#8 normally open but closed at 288°, 713–4 normally closed and 715–5 normally closed.

It should be noted that relay 703 (FIGURE 22*c*) is held via 719–2 normally open but closed (FIGURE 22*b*) 31–8 normally closed, 703–1 normally open but closed.

The cam line 55 rotates to 0° when the card 28 rises above card present lower switch 180 via 703–10 normally open but closed, 729–6 normally closed, card present lower 180 normally closed, 288°–#9 normally open but closed, 719–3 normally open but closed, 709–5 normally closed and 703–4 normally open but closed.

Relay 703 drops out by opening of points 719–2 card present when relay 719 drops out because the operator has removed the magnetic ledger card 28 from the machine returning card present upper switch 178 to its normally open state.

"Record error" operates in much the same manner as "read error" but in this case the "record hub" remains energized so that reinsertion of the magnetic ledger card 28 (after depressing MCL reset which causes 724 to drop and 729 to pick, see FIGURE 22*b*) will cause the second half of the cycle (second 360° rotation of the cam line) to be repeated, namely the record and read check head sweep.

"Duplicate" is initiated by the sensing of a "full card" condition. A full card is one that has no more usable lines for posting on the magnetic ledger card.

The full card switch 416 (FIGURE 18) is mounted remotely and is transferred by cam 407 which is mounted on the driven end of a friction clutch 404. The friction clutch receives its power from gear 402 which meshes with the card feed clutch pinion 270. The friction clutch 404 is activated every time the cam line goes through the 72° position. Therefore, the full card cam 407 rotates every time the card feed clutch 404 rotates, but it only rotates one revolution which represents two inches of card travel. If the amount of card feed equals or exceeds this distance, it means that there are more posting lines available on the magnetic ledger card 28.

The normal time for sampling the full card condition is at the moment of line sensing when the card has reached the posting line. If there are more posting lines available, then the card full switch 416 will have been cammed open by the card full cam 407. If the card is full, the card full cam would not have made one full revolution and the switch 416 would still be closed at the time of sampling. This would cause the full card relay 709 (FIGURE 22*a*) to be energized and a duplicate mode to be initiated in the calculator circuits 11. As far as the magnetic ledger card machine 24 is concerned, the energizing of the full card relay 709 will cause voltage to be applied to the cam line magnet and the cam line will rotate through 216° to 288° and the magnetic ledger card 28 will feed OUT to the eject position. The next magnetic ledger card inserted (a blank one) will have all of the heading and totals to date printed and recorded on it. Since there should be no information on the newly inserted card, the heading and totals to date can automatically be put on the new magnetic ledger card. In the circuit diagram a full card is sensed at the time of line sensing on IN feed, the 144° position. Full card relay 709 (FIGURE 22*a*) is picked when there are no more posting lines on the card via 31–1 normally closed, 703–6 normally closed, head latch #1 (194) normally open but transferred, 721–5 normally closed, 711–2 normally closed, 144°–#7 normally open but closed at the 144° position, full card switch 416 normally closed when the card is full, and 713–3 normally open but closed. OUT drive is initiated by energizing feed drive magnet 392 via 709–3 normally open but closed and the usual circuit path after the cam line has rotated to 288° (through 709–3 normally open but closed, 288°–#8 then closed, 713–4 and 715–5).

If a duplicate mode is desired it will be so wired on the program board, and on the re-insertion of the card the duplicate card relay 707 (FIGURE 22*b*) will be operated from the calculator through "duplicate" hub this will cause the first read scan to be ignored and the information stored in memory to be recorded on the card. This routine is also partially disclosed in the companion applications on the system mentioned above.

The last option is "eject." If for some reason the operator desires to remove the magnetic ledger card from the unit, she may depress the "eject key" FIGURE 22*b*. This will apply voltage to the cam line magnet if; the cam line is at 144° and head is latched (through head latch #2 (194), 721–4, and 144°–#5 closed) or the cam line is at 216° (through 216°–13 closed at the 216° position). The cam line then rotates to the 288° position. When the cam line reaches the 288° position, the card feed drive magnet 392 will be energized as long as the operator depresses the eject key (through 288°–#8 closed, 713–4, and 715–5).

In review:

| Cam Line Position | Head Position | Operation |
|---|---|---|
| 0 | Home | Card Entry. |
| 72 | do | Card Alignment. |
| 144 | do | Head Sweep. |
| 144 | Head Latched | Feed into Posting Line. |
| 144 | do | Line Sense or Sense for Full Card. |
| 216 | do | Posting. |
| 288 | do | Feed Out to Magnetic Transducing Station. |
| 288 | do | Sense Bottom of Card. |
| 288 | do | Return Head to Home. |
| 72 | Head Home | Align Card. |
| 144 | do | Record Sweep. |
| 144 | do | Check Sweep. |
| 288 | Head Latched | Feed Out. |

It can be seen from the foregoing that two rotations of the cam line are required for one normal card handling cycle. It also is apparent that the unit is serially controlled; that is, one operation follows another and the unit must complete one operation before going on to the next.

While there have been shown and described and pointed out fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A machine for automatically handling unit records having a machine readable portion and a human readable portion thereof, the machine comprising:

(a) means for aligning a one of said unit records at a machine read-write station, (b) movable transducer means for scanning the machine readable portion of the so aligned record while the record is stationary at the read-write station, (c) means for automatically feeding the record after the scan thereof to a predetermined position at a printing station, (d) means for printing on the record at the predetermined position of the printing station, and (e) means for automatically feeding the record out of the printing station after printing thereon.

2. A machine for automatically handling machine and human readable unit records such as a ledger card with a magnetizable track on a face thereof, the machine comprising:

(a) means for feeding and aligning the record such that the magnetizable track on the back of the record is at a magnetic transducer read-write station, (b) a movable magnetic transducer means at the read-write station and movable along the magnetizable track of the aligned record, (c) means for driving the magnetic transducer for a scan across the stationary aligned record, (d) record feed means for automatically feeding the record after a scan thereof toward a print station, and automatically stopping the feeding of the record in response to a sense point thereon at a predetermined position relative to the print station, and, after a print operation, for returning the record to the magnetic transducer read-write station, (e) means for automatically printing on a predetermined line of the record while at the printing station, (f) and automatic means for activating the transducer drive means to scan the record at least twice while the record is stationary at the read-write station, once for recording additional information on the magnetizable track and a second time for checking the information so recorded.

3. A machine as defined in claim 2 wherein the movable magnetic transducer is guided on a track and moves in the same direction for all transducing operations and is returned to a home position between the transducing operations.

4. A machine as defined in claim 3 where the magnetic transducer is in contact with the magnetizable strip on the record during the transducing operation but is held out of contact during the return of the transducer to the home position.

5. A machine for automatically handling and sequentially operating upon ledger cards having a magnetizable stripe on a face thereof, the machine comprising;

(a) an insertion throat, (b) means for driving a card inserted into the throat to a predetermined read-write position referenced by the bottom and one edge of the card, (c) means for sensing when the card is aligned in the read-write position, (d) means for clamping the card in the read-write position, (e) a movable magnetic transducer, (f) means for guiding the movable transducer in a path adjacent the magnetic stripe on the card while the card is clamped at the read-write position, (g) means for driving the transducer to scan across the magnetic stripe on the card and return, (h) means for sensing the position of the transducer at each end of its scan, (i) means for automatically driving the card, after a transducer scan across the card to a print position, (j) means for sensing the position of the card and stopping the feed of the card with a predetermined line thereof at a print position, (k) automatic means for printing on the record at the print position, and (l) feed means operable after the print to return the card to the insertion throat.

6. A machine for automatically handling the sequentially performing magnetic transducing and print operations on a unit record card of the ledger posting type having a magnetizable stripe across the back and adjacent the bottom edge thereof, the machine comprising;

(a) support chassis, (b) a continuously operable drive motor supported from the chassis, (c) a plurality of clutches driven from the motor selectively operable in predetermined sequence for controlling mechanical elements of the machine, (d) a plurality of cams on a cam line driven through one of the clutches from the motor the cams timed to operate mechanical elements and electrical switches in a predetermined sequence, (e) a card feed throat including a side guide block on the chassis, (f) a gate operable from one of the cams and positioned for selectively closing the bottom of the card feed throat, (g) an inclined alignment wheel continuously driven by the motor and supported to be selectively positionable by one of the cams into the feed throat to contact and feed a card therein toward the side guide block and gate, (h) switch means for sensing when a card is in an aligned reference position with its bottom on the gate and side against the side guide block, (i) a movable magnetic transducer head, (j) guide track means for guiding the head in a path adjacent the magnetic stripe when the card is in the reference position, (k) drive means for driving the head for a scan across the record and for returning the head to a home position, (l) means adjacent the guide track for sensing the position of the head at each end of the scan, (m) a print station including printing means supported on the chassis below the gate, (n) feed means automatically controlled by said cams to feed the card in opposite directions into and out of the print station, and (o) control means for accomplishing the foregoing operations automatically and in sequence.

7. A machine as defined in claim 6 wherein the movable magnetic head includes a gimballed multitrack head movable from a transducing position to a retracted position in a head carrier and detent means on the carrier for selectively detenting the head in retracted position.

8. A machine as defined in claim 7 further comprising stationary cam means adjacent the track means, the cam means positioned for operating the detent means to detent the head in retracted position after the end of a transducing scan and for releasing the detent at a home position.

9. A machine as defined in claim 6 wherein the head is pulled along the track means during a transducing scan by an inclined tape means inclined in a direction to funnel a card from the throat to the print station during feed in to print station, and inclined in an opposite direction to funnel a card from the print station into the throat during feed back out from the print station.

10. A machine as defined in claim 9 wherein the head drive is from the motor through a selectively operable head drive clutch, and a head latch clutch is operable to latch the head at the end of a transducing scan and selectively release the head and wherein drive means includes a spring motor.

11. A machine as defined in claim 10 wherein the detent of the head is released at home position, allowing the head to rest on an inclined ramp positioned adjacent the edge of a card in transducing position so when head drive starts, the head will ride down the ramp and onto the card without bouncing.

12. A machine as defined in claim 11 wherein the throat and chassis will accommodate a card wider than the scan and further including a wide card skirt for guiding the portion of card not guided by the inclined tape means.

13. A machine for automatically handling magnetic ledger cards, the machine comprising:

(a) card feed means for aligning and clamping the record at a magnetic read-write station, (b) movable magnetic transducer head for scanning the so aligned record while the record is clamped in a stationary referenced position at the read-write station, (c) means for automatically feeding the record to a predetermined position at a printing station after the scan thereof, (d) automtaic print out means for printing on the record at its predetermined position in the printing station, (e) means for automatically feeding the record back to the read-write station, and (f) automatic means for again moving the transducer means to scan the stationary record at least one more time at the read-write station.

14. A machine as defined in claim 13 wherein the head is driven during a transducing scan by motor means connected to the head by an inclined drive tape inclined in a direction to funnel a card in for alignment and by an oppositely inclined return tape to funnel a card out during feed in a reverse direction.

15. A machine for automatically handling machine and human readable unit records such as a ledger card with a magnetizable track on the reverse side thereof, the machine comprising:

(a) means for feeding, aligning, and clamping the record such that the magnetizable track on the back of the record is at a magnetic transducer read-write station, (b) a movable magnetic transducer head at the read-write station and movable in alignment along the magnetizable track on the record, (c) automatic means for driving the magnetic transducer head for a scan across the record after it has been aligned and clamped, (d) record feed means for automatically feeding the record after a scan thereof toward a print station, and stopping the record in response to a sense point thereon at a predetermined position relative to the print station, and, after a print operation, for returning the record to the magnetic transducer read-write station, (e) means for automatically printing on a predetermined line of the record while at the printing station, and (f) automatic means for activating the head drive means to scan the record at least twice while the record is stationary at the read-write station after being fed out from the print station once for recording additional information on the magnetizable track and a second time for checking the information so recorded.

16. A machine for automatically handling and sequentially operating upon ledger cards having a magnetizable stripe on the back side thereof, the machine comprising:

(a) an insertion throat carried by a support chassis, (b) selectively positionable aligning wheel means for diagonally driving a card inserted into the throat to a predetermined read-write position referenced by the bottom and one edge of the card, against a bottom gate and side reference surfaces, (c) electric switch means on the reference surfaces for sensing when the card is in the read-write position, (d) inactive card feed means for clamping the card in the read-write position, (e) a movable magnetic transducer head carrier including a gimballed and retractable head carried thereby, (f) at least one track for guiding the movable transducer head carrier in a path across the card while the card is clamped at the read-write position, (g) electric motor and tension tape means for driving the transducer head carrier to scan across the stripe and spring motor and tension tape means for driving the head carrier during its return, (h) electric switch means for sensing the position of the transducer head carrier at each of its extreme positions before and after a scan, (i) card feed means for automatically feeding the card, after a transducer scan across the card, to a print position, (j) electric switch means for sensing the position of the last line printed on the card and stopping the feed of the card to print on the next available line thereof at the print position, (k) an automatic typewriter for printing on the record at the print position, (l) punch means to punch a sensing hole in the card related in position to the last line printed, and (m) card feed means operable after the print operation to feed the card in a reverse direction.

17. A machine as defined in claim 16 further comprising a full card sensing mechanism for sensing when a card having no more printing space has to be fed to print position and means for automatically ejecting the so sensed full card.

No references cited.

DARYL W. COOK, *Acting Primary Examiner.*